(12) United States Patent
Hundley et al.

(10) Patent No.: US 10,713,325 B2
(45) Date of Patent: Jul. 14, 2020

(54) REAL ESTATE ACTIVITY ANALYTICS SYSTEM AND METHOD

(71) Applicant: 1 Park Place, San Diego, CA (US)

(72) Inventors: Steve Hundley, Poway, CA (US); Drew Meyer, Escondido, CA (US); Steve Fox, Shadow Hills, CA (US)

(*) Notice: Subject to any disclaimer, the term of this patent is extended or adjusted under 35 U.S.C. 154(b) by 143 days.

(21) Appl. No.: 15/952,219

(22) Filed: Apr. 12, 2018

(65) Prior Publication Data

US 2018/0300342 A1   Oct. 18, 2018

Related U.S. Application Data

(60) Provisional application No. 62/484,592, filed on Apr. 12, 2017.

(51) Int. Cl.
| | |
|---|---|
| *G06F 16/00* | (2019.01) |
| *G06F 16/9537* | (2019.01) |
| *G06Q 50/16* | (2012.01) |
| *G06F 16/31* | (2019.01) |
| *G06F 16/9535* | (2019.01) |
| *G06F 16/957* | (2019.01) |

(52) U.S. Cl.
CPC ........ *G06F 16/9537* (2019.01); *G06F 16/313* (2019.01); *G06F 16/9535* (2019.01); *G06F 16/9577* (2019.01); *G06Q 50/16* (2013.01)

(58) Field of Classification Search
CPC .................................................. G06F 16/9537
USPC .......................................... 707/603; 705/26.1
See application file for complete search history.

(56) References Cited

U.S. PATENT DOCUMENTS

| | | | | |
|---|---|---|---|---|
| 8,788,431 | B1 * | 7/2014 | Shao ...................... | G06Q 50/16 705/313 |
| 2008/0097767 | A1 * | 4/2008 | Milman ................. | G06Q 30/02 705/1.1 |
| 2008/0275794 | A1 * | 11/2008 | Ioimo .................... | G06Q 30/08 705/26.1 |
| 2016/0155181 | A1 * | 6/2016 | Romaya ............... | G06Q 50/167 705/26.63 |

* cited by examiner

*Primary Examiner* — Chelcie L Daye
(74) *Attorney, Agent, or Firm* — Merle W Richman Esq.

(57) ABSTRACT

Embodiments of real estate property activity analytics where a system user may analyze real estate activity based on one or more geographical boundaries and other parameters including sales and agent diversity. The system may generate activity analytics that provide a user with potential listing and selling opportunities in various regions of the one or more geographical boundaries. Other embodiments may be described and claimed.

20 Claims, 24 Drawing Sheets

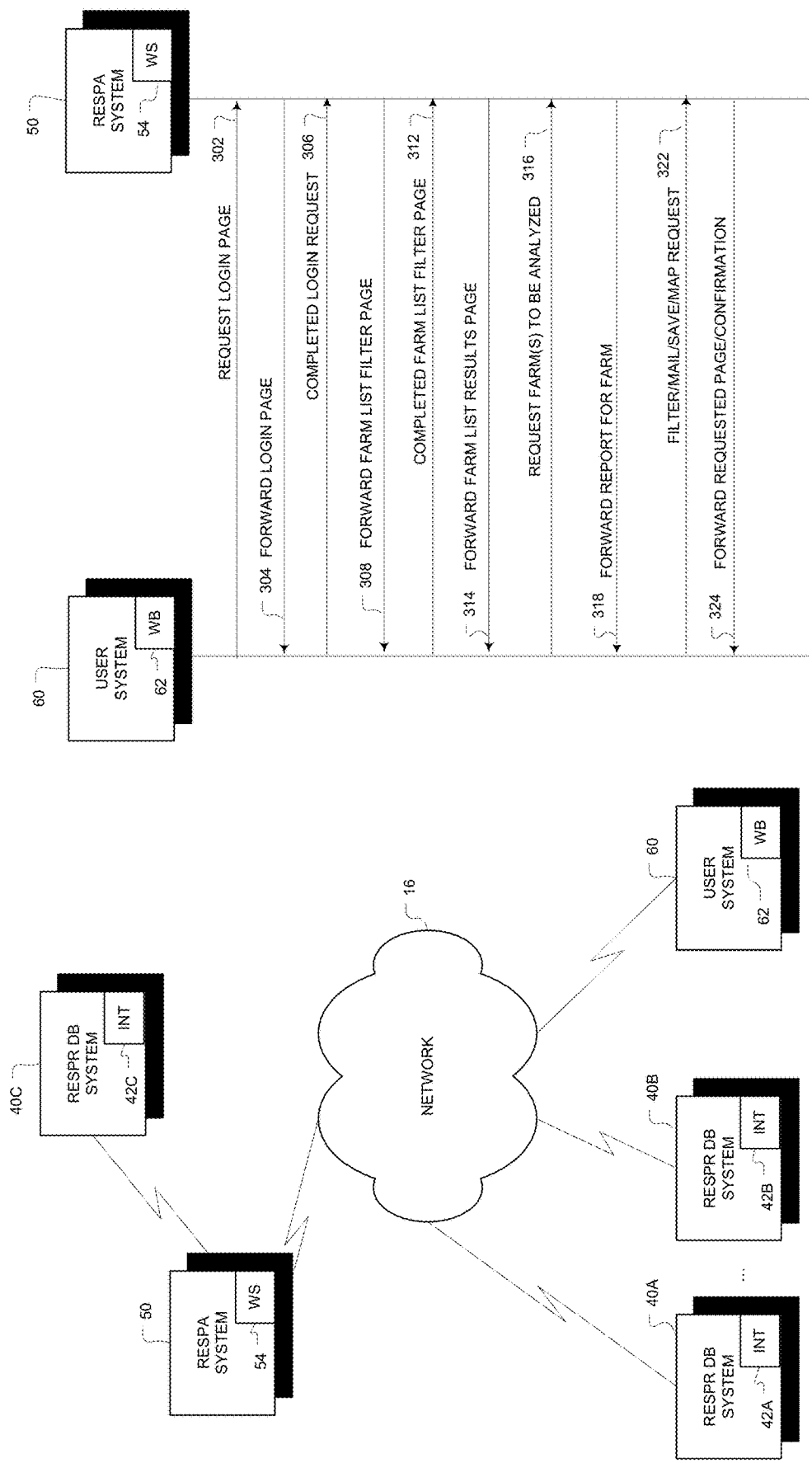

FIGURE 6C

| Overall Competition | Sales Competition | Volume Competition | Listing Competition | | | | |
|---|---|---|---|---|---|---|---|
| Competition | Name | Active | List Agent - Sold | Sale Agent - Sold | List Volume | Sale Volume | Total Agent Volume |
| 8.72% | Agent A | 2 | 6 | 4 | $13,34 m | $9,359 m | $42,04 m |
| 3.72% | Agent B | 3 | 2 | 0 | $3,14 m | $4,90 m | $7,04 m |
| 3.66% | Agent C | 3 | 2 | 3 | $6,40 m | $4,40 m | $10,80 m |
| 3.48% | Agent D | 3 | 2 | 3 | $6,60 m | $3,09 m | $9,69 m |
| 2.75% | Agent E | 0 | 2 | 3 | $7,20 m | $3,40 m | $10,60 m |
| 2.60% | Agent F | 0 | 2 | 3 | $5,38 m | $3,81 m | $8,18 m |
| 2.65% | Agent G | 0 | 3 | 0 | $5,73 m | $0 | $5,73 m |
| 2.19% | Agent H | 1 | 2 | 0 | $5,93 m | $0 | $5,93 m |
| 1.89% | Agent I | 0 | 2 | 0 | $6,09 m | $0 | $6,09 m |
| 1.95% | Agent J | 0 | 1 | 3 | $4,89 m | $4,40 m | $9,24 m |

Showing 1 to 10 of 88 entries

FIGURE 6H

| Overall Competition | Sides Competition | Volume Competition | Listing Competition 124J | | | |
|---|---|---|---|---|---|---|
| 126J | | | | | | |
| Volume % | | Name | List Volume | Buy Volume | Avg Sale | Volume |
| 13.29% | | Agent A | $19.54 m | $11.50 m | $9.50 m | $42.04 m |
| 4.65% | | Agent B | $0 | $12.44 m | $12.44 m | $32.44 m |
| 3.47% | | Agent C | $7.25 m | $3.40 m | $3.40 m | $19.65 m |
| 3.45% | | Agent D | $6.49 m | $4.29 m | $4.29 m | $30.69 m |
| 3.15% | | Agent E | $6.60 m | $1.24 m | $3.00 m | $9.68 m |
| 3.01% | | Agent F | $4.84 m | $4.40 m | $4.40 m | $9.23 m |
| 2.99% | | Agent G | $5.38 m | $3.53 m | $3.63 m | $9.18 m |
| 2.74% | | Agent H | $0 | $8.40 m | $4.28 m | $8.40 m |
| 2.39% | | Agent I | $2.14 m | $4.98 m | $2.45 m | $7.04 m |
| 1.98% | | Agent J | $2.28 m | $3.85 m | $3.85 m | $6.11 m |

Showing 1 to 10 of 98 entries    128J — Previous 1 2 3 4 5 ... 10 Next

REAL ESTATE ACTIVITY ANALYTICS SYSTEM AND METHOD

TECHNICAL FIELD

Various embodiments described herein relate generally to real estate property sales and marketing systems including apparatus, systems, and methods used in online or electronic real estate sales and marketing systems.

BACKGROUND INFORMATION

A real estate transaction in many markets commonly includes a listing agent or brokerage and a buyer agent or brokerage where the listing agent represents the property owner(s) and the buyer agent represents the property buyer(s). It may be desirable to provide listing agents, buyer agents, property owners, investors, title companies, and other real estate related entities with analysis about properties in regions including viability of such regions for marketing by listing agents, buyer agents, property owners, investors, title companies, and other real estate related entities.

BRIEF DESCRIPTION OF THE DRAWINGS

FIG. 1 is a block diagram of real estate property analysis (RESPA) architecture according to various embodiments.

FIG. 2 is a diagram of communications between an RESPA application user system and a RESPA system according to various embodiments.

FIG. 6C illustrates a Farms list graphical user interface (GUI) display listing various Farm types selectable as filters that may be used to generate a Farms list report according to various embodiments.

FIG. 6H illustrates a Farm Report graphical user interface (GUI) display showing a second segment, first tab of a single Farm analytic report including real estate agents overall competition according to various embodiments.

FIG. 6J illustrates a Farm Report graphical user interface (GUI) display showing a second segment, third tab of a single Farm analytic report including real estate agents volume competition according to various embodiments.

FIG. 6R illustrates a Farm Map tool graphical user interface (GUI) display of a second segment or section showing details of properties of a Farm according to various embodiments.

DETAILED DESCRIPTION

Figure 3:
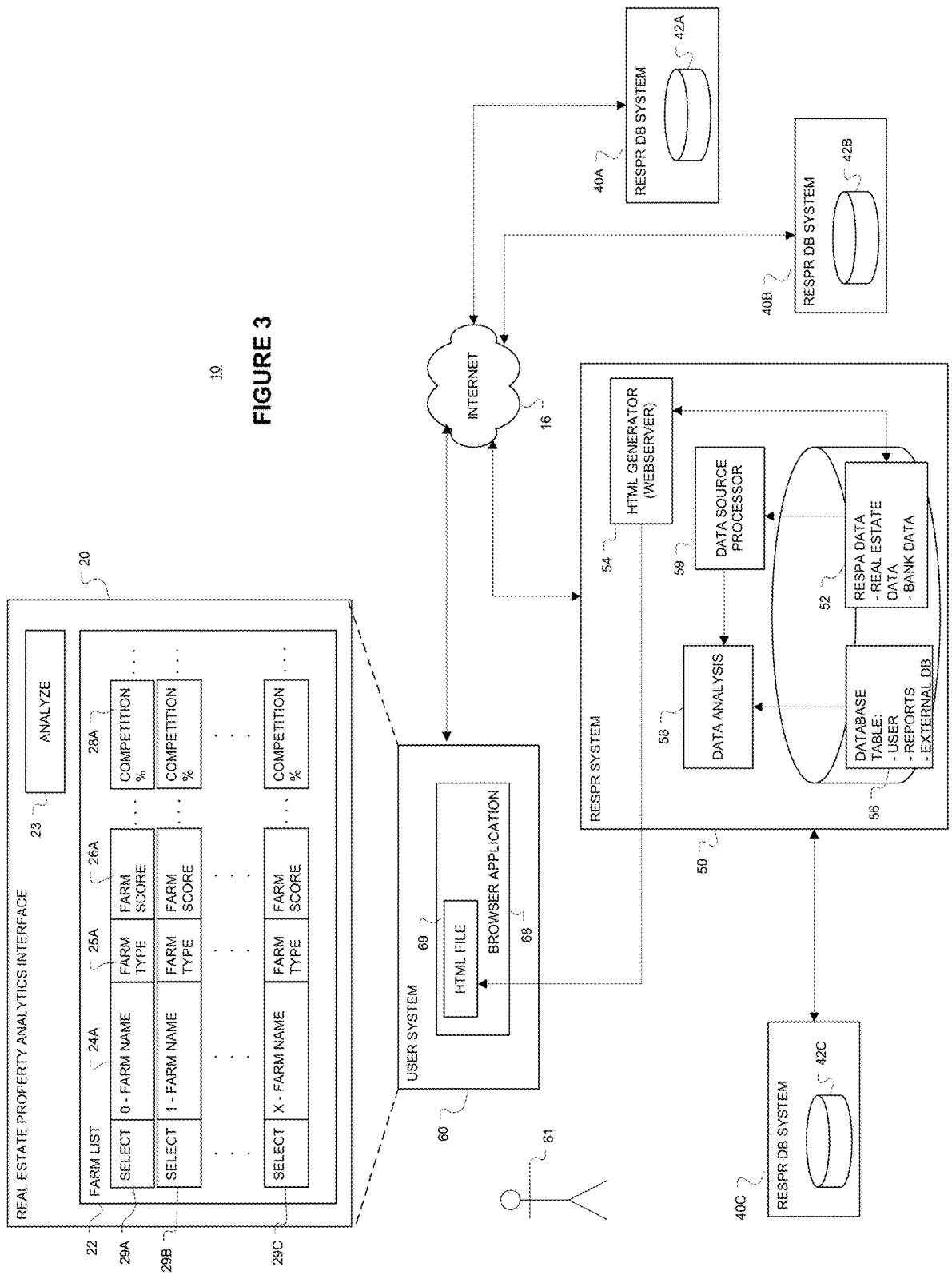
FIG. 3 is a block diagram of RESPA architecture according to various embodiments.

As noted a real estate transaction in many markets may require or employ a listing agent or brokerage and a buyer agent or brokerage where the listing agent represents the property owner(s) and the buyer agent represents the property buyer(s). Listing agents, buyer agents, property owners, investors, title companies, and other real estate related entities expend time and other resources to develop market share, determine market conditions, and other factors that affect their use of resources. For example, a real estate agent (agent), may wish to increase their listings (properties for sale for owner they represent) and sales, accordingly an agent may want to contact property owners to see if they are interested in selling their property (either as their listing agent or to their buyer). An agent may use mailers or in person activities to solicit property owners. Such activities may be expensive and time consuming. Accordingly, an agent may want to limit their efforts to properties that are more likely to need/want their services.

Similarly, an investor or party interested in buying properties may want to know which areas or properties are more likely to sell in the future to protect their investment. In addition, a property owner may want to know if their property is likely to sell, i.e., a good time to market their property. Embodiments of the present invention may be employed by agents, prospective property owners, and current property owners to optimize their respective goals/activities. In an embodiment, an agent or prospective property owner may employ a system to define groups of properties (termed Farms hereinafter) based on pre-existing delineations or their own list or geographical boundaries and other factors/attributes. An embodiment of the present invention may enable a user to further analyze selected or created Farms using various criteria to determine or rate the Farm(s) based on desired activity (ability or likelihood to be sold in an embodiment).

FIG. 1 is a block diagram of real estate property analysis (RESPA) architecture 10 according to various embodiments. As shown in FIG. 1, RESPA architecture 10 may include an application based user system 60, a RESPA system 50, and real estate property related (RESPR) database (DB) systems 40A, 40B, 40C (or systems that may include real estate data) according to various embodiments. An application user system 60 may communicate with the RESPA system 50 via one or more networks 16 where the networks may be local wired or wireless networks or a network of networks such as the Internet. The RESPA system 50 may communicate with a RESPR DB system 40A, 40B, 40C via a network 16 or directly as shown in FIG. 1. In an embodiment, a RESPR DB system 40A, 40B, 40C may be part of the RESPA system 50.

In an embodiment, a RESPR DB system 40A, 40B may be any system that includes information or content related to real estate including realtor data such as Multiple Listing Services (MLS) data, tax data from local, county, state, or federal sources, mortgage and deed information from Title companies and mortgage lenders, maps from various providers including Google®, MapQuest®, Mapbox®, and others, and other real estate data. Real estate data can include owner data including whether a person, persons, or entity owns multiple properties, appear to be a first time buyer/owner, or have a history of moving (buying and selling properties).

In an embodiment, a RESPA system 50 may continuously scrape, request, or receive updated data from RESPR DB systems 40A, 40B, 40C. A RESPA SYSTEM 50 may store received, requested, or scraped real estate related data from RESPR DB systems 40A, 40B, 40C. In an embodiment, a RESPA SYSTEM 50 may use an application programming interface (API), adapter, or other interface (42A-C) to request data from or communicate data with a RESPR DB system 40A, 40B, 40C in batch mode or real time. A RESPR DB system 40A, 40B. 40C may employ a search protocol based on a RESPA SYSTEM 50 request and provide real estate related data in a predetermined format or an un-determined format. A RESPR DB system 40A, 40B, 40C may also provide a raw data stream to a RESPA system 50 where the RESPA system 50 may parse the raw data based on various application user's criteria and RESPA system 50 formulated criteria.

A RESPA SYSTEM 50 may employ semantic language and heuristics searches and natural language processing to develop queries for the RESPR DB systems 40A, 40B, 40C and to analyze data provided by RESPR DB systems 40A, 40B, 40C. An application user via a system 60 may provide one or more terms or filters where a RESPA SYSTEM 50 may to develop queries for a RESPR DB system 40A-C in an embodiment.

In an embodiment, a RESPA system 50 may include a web-server 54 where the web-server 54 may be configured to communicate messages, graphical user interfaces, and other content with a user system 60. The web-server 54 may also be configured to communicate messages and content with a RESPR DB system 40A, 40B, 40C. In an embodiment, a user system 60 may host a web browser application 42 such as Internet Explorer, Safari, Netscape, Chrome, Firefox, or Opera 34 that may be configured to communicate messages and content with a RESPA system 50. In an embodiment, a RESPR DB system 40A, 40B and application user system 60 may be any computer device capable of hosting an interface that can communicate with a RESPA system 50 including a web browser application 42 including a personal computer, personal data assistant, or web enabled cellular phone or web enabled tablet computer.

In an embodiment, a RESPA system 50 may employ a web framework (WF) or web application framework (WAF) including Ruby on Rails, Java, Python, Apache, Django, or other software or architecture to provide web pages, framework, or wire frames to an application user system 60. A RESPA system 50 may also employ Software as a Service (SaaS) to provide data and executable instructions to an application user system 60 and the RESPA system 50 webpages may be built using on a Rudy on Rails framework or other web frameworks. In an embodiment, an application user system 60 may host an application operating natively where the application communicates data with the RESPA system 50 (such as application downloaded from an application provider or provided by the RESPA system 50). An application user system 60 may use various operating systems including Microsoft operating systems (Windows), Linux, Mac OS X, Android, WEB OS, and others to run a RESPA interface program or web browser. In an embodiment, a RESPA system 50 or a RESPR DB system 40A, 40B may provide an interface application to run natively on an application user system 60.

FIG. 2 is a diagram of communications 300 between a RESPA system 50 and an application user system 60 according to various embodiments. To protect confidential information included in real estate data In an embodiment, an application user 61 (FIG. 3) via a user system 60 may be required to login to communicate with a RESPA system 50. In such an embodiment, a user system 60 interface or web browser 62 may generate or populate a login request (communication 302) that is processed by the RESPA system 50 such as invoking an application that links with the RESPA SYSTEM 50 and requesting a login web page via a web browser. A RESPA system 50 may receive a login request or application start and generate a login page communication 304. An application user 61 via an application user system 60 may complete the login page and forward a completed login request communication 306.

In an embodiment, an application user of the RESPA system 50 may be required to login to provide security between the application users and the RESPA system 50. In an embodiment, an application user via an application user system 60 may be automatically login based on their system 60 and data stored in an application system 60 (application data, web browser cookies, and other stored data).

Figure 6A:
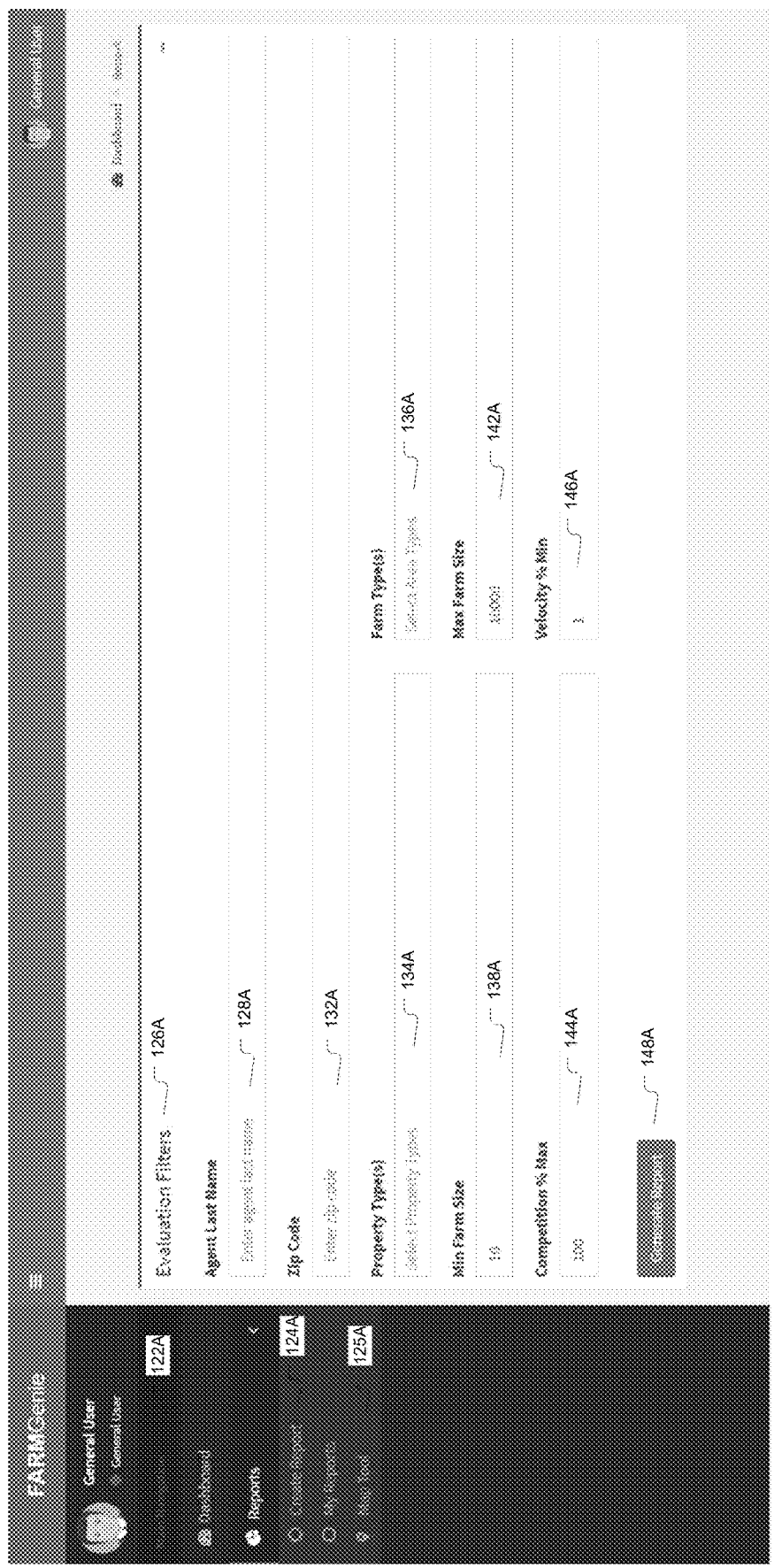
FIG. 6A illustrates a real estate property regions, termed "Farms" list graphical user interface (GUI) display for selecting evaluation filters or factors that may be used to generate a Farms list report according to various embodiments.

Upon providing a valid login if required, a RESPA system 50 may forward a Farm list filter page (communication 308) to a user system 60 via a network 16, such as the graphical user interface screens 120A-120D shown in FIGS. 6A-6D. FIG. 6A illustrates a Farms list request graphical user interface (GUI) display 120A for selecting evaluation filters or factors that may be used to generate a Farms list report according to various embodiments. As shown in FIG. 6A, a RESPA system 50 interface 120A may have a navigation section 122A with an option to create reports 124A among other options including viewing previously saved reports and selecting a Map tool discussed below with reference to FIGS. 6Q to 6S. As also shown in FIG. 6A, interface 120A also includes an evaluation filters section 126A where a User 61 via their system 60 may select one or more filters to generate a list of one or more Farms.

In an embodiment, a User 61 may provide several, initial filters 126A that a RESPA SYSTEM 50 employ to collected real estate data to develop groups of properties, termed Farms. Initial filters may include an Agent 128A, zip code(s) 132A, property type(s) 134A, farm type(s) 136A, minimum and maximum Farm size(s) 138A, 142A, competition percentage maximum 144D, and velocity percentage minimum 146D to form Farms 148A. Each of the filters 132A-146D may be used to collect and analyze real estate data, analyze already collected real estate data, and collect additional real estate data and analyze the new real estate data and already collected real estate data from a RESPR DB system 40A, 40B to form one or more Farms.

Figure 6B:
FIG. 6B illustrates a Farms list graphical user interface (GUI) display listing various property types selectable as filters that may be used to generate a Farms list report according to various embodiments.

In one embodiment, one or more Farms may be formed (in a Farm list report) for a specific Agent 128A, groups of Agents, a brokerage, or groups of brokerages. As explained below, an Agent 128A, groups of Agents, a brokerage, or groups of brokerages may have their own defined Farms (called Farm Genie) that they may select and may have created. Further, an Agent may have their personal Farm (called Rep Farm) that they may select and may have created. A User 61 may also select one or more zip codes 132C as a filter for properties to be included in Farm(s). FIG. 6B illustrates a Farms list request graphical user interface (GUI) display 120B listing various property types 134B selectable as filters that may be used to generate a Farms list report according to various embodiments. As shown in FIG. 6B, the selectable property types include single family, condo/townhouse, and multi-family (where other types may be available in other embodiments). It is noted that one or more property types may be selected in an embodiment. The property types of real estate properties to be considered may be provided in the RESPR DB 40A-C or generated by RESPA SYSTEM 50 system.

Figure 6C:
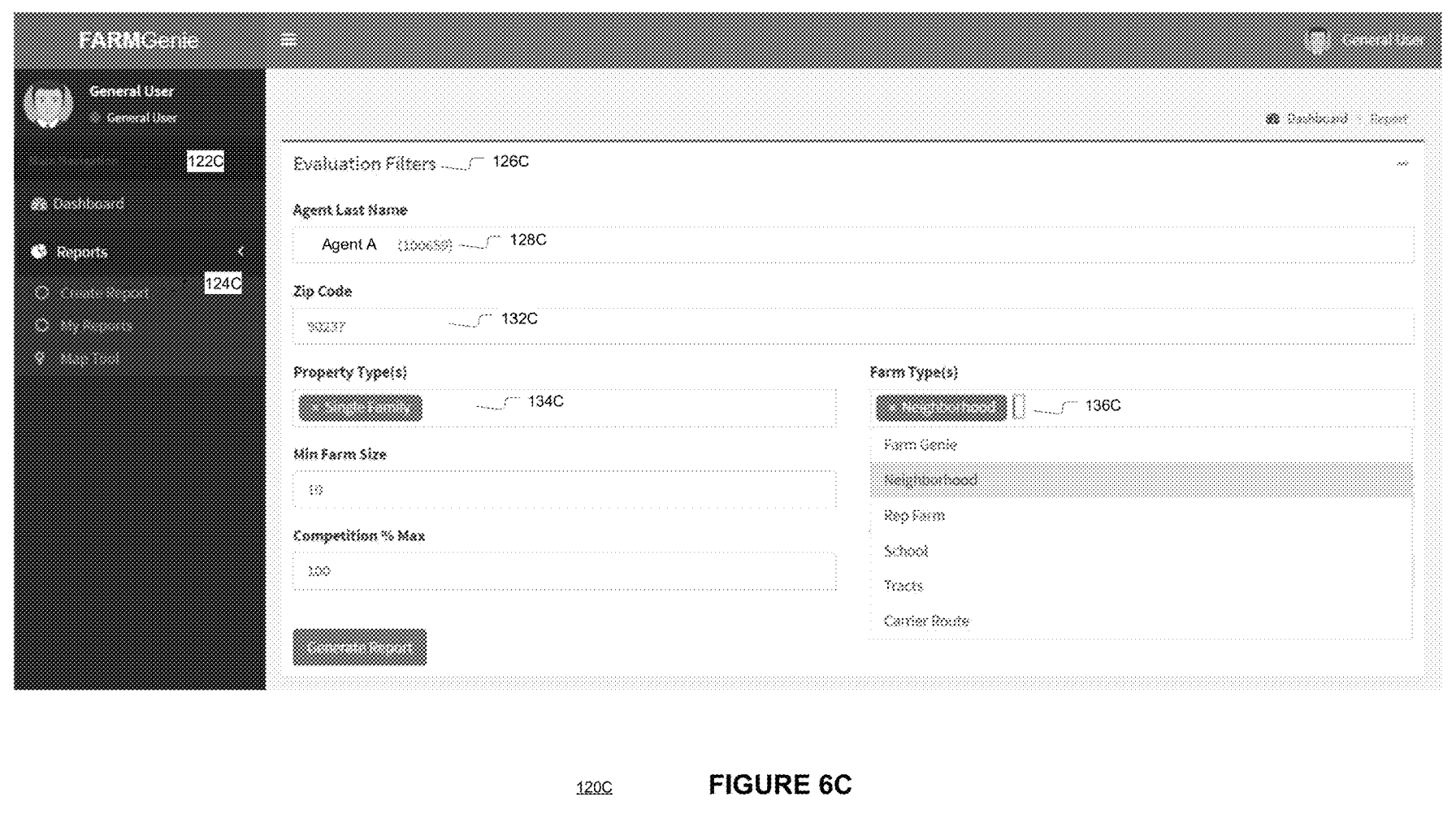

FIG. 6C illustrates a Farms list request graphical user interface (GUI) display 120C listing various Farm types 136C selectable as filters that may be used to generate a Farms list report according to various embodiments. As shown in FIG. 6C, the selectable Farm types include Farm Genie, Neighborhood, Rep Farm, School, Tract, and Carrier Route. As noted, a Farm Genie may include properties selected by the Agent or their brokerage. In an embodiment, a Farm Genie may be formed by a User 61 via selection of geographical boundaries. A User 61 may draw boundaries on a map to form a geographical region in one embodiment. In an embodiment, a User 61 may employ a map tool interface 120Q shown in FIG. 6Q to draw their desired geographical regions or boundaries.

A RESPA SYSTEM 50 system may then determine the properties that are completely or at partially enclosed by the geographical region. A RESPA SYSTEM 50 system may use real estate data to determine whether a property is located within (completely or partially in an embodiment) a selected or created geographical region. The real estate data used to determine a property's location may include tax rolls (accessor's parcel number APN), school roles, neighborhood roles, mail carrier routes, or other location information, other factors, and combinations thereof.

Neighborhood Farm types may also be formed based on geographical regions that may be denoted as a "neighborhood" by various groups including local, City, County, State, and other government agencies. Tracts Farm types may be similarly formed based on geographical regions denoted as "tracts" by various groups including local, City, County, State, and other government agencies. In addition, Tracts may be group of properties developed and defined by a builder. School Farm types may be formed based school property roles adopted by various groups including local school boards, City school boards, County school boards, and State school boards. Carrier route Farm types may be formed based on postal carrier property roles adopted by local, regional, or Federal post offices or organizations. The properties associated with the various Farm types may be provided in the RESPR DB 40A-C, generated by a RESPA SYSTEM 50 system, or provided by other groups as noted. In an embodiment, a User 61 may select one or more Farm types to be included in the Farm list reports.

Figure 6D:
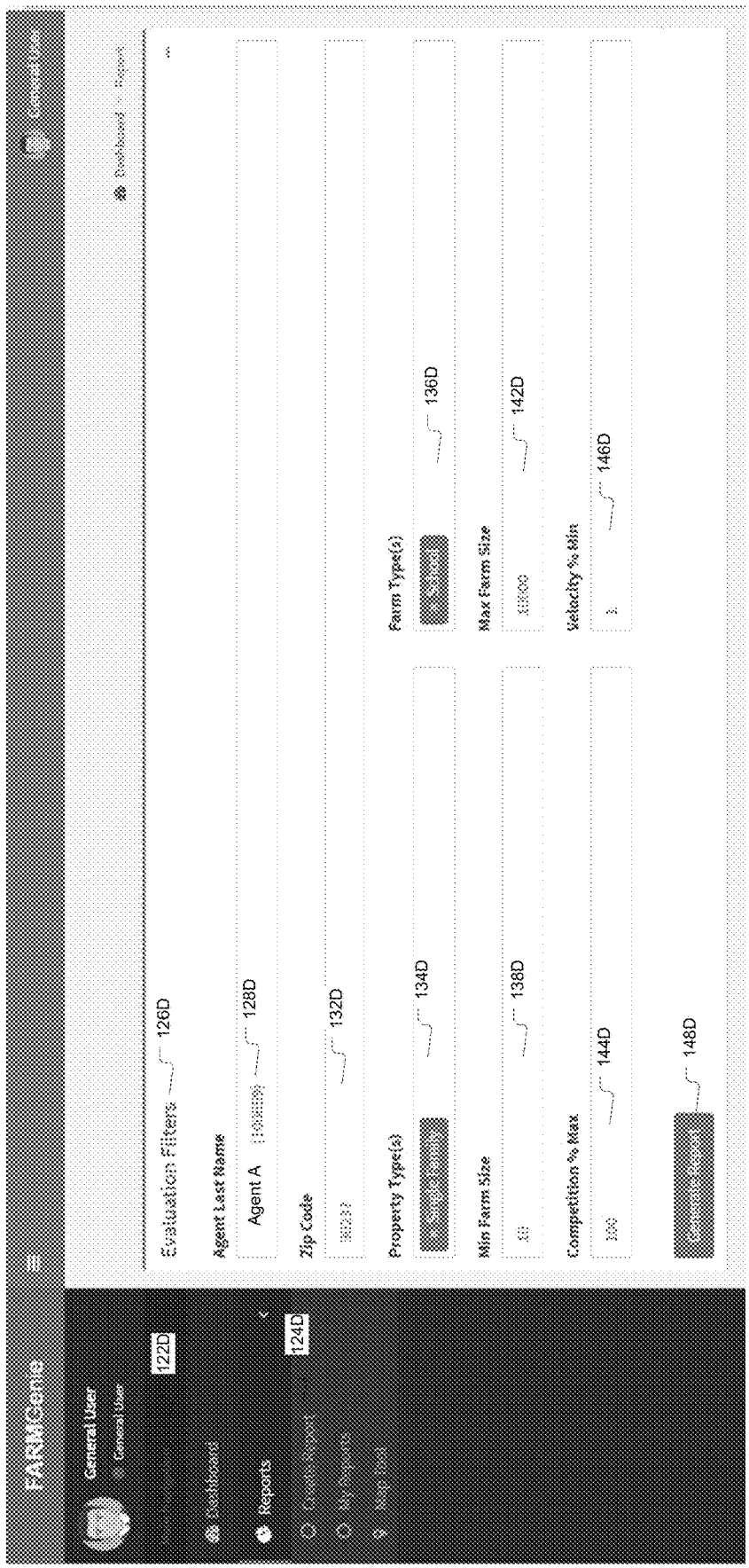
FIG. 6D illustrates a Farms list graphical user interface (GUI) display listing various Farm types selected as filters to generate a Farms list report according to various embodiments.

FIG. 6D illustrates a Farms list request graphical user interface (GUI) display 120D listing various Farm types selectable as filters to generate a Farms list report according to various embodiments. As shown in FIG. 6D, a User 61 may be able to select the minimum number of properties 138D and the maximum number of properties 142D that a resultant Farm may have in a Farm list. A User 61 may also be able to select the maximum competition percentage 144D that a resultant Farm may have in a Farm list. In an embodiment, the competition percentage is dynamically created for each formed Farm (in the initial Farm list). In an embodiment, the competition percentage for a Farm may be equal to the percentage of active properties represented by the top Agent, e.g., Agent X currently has 10 of 100 active properties in the Farm, other Agents have less, the competition percentage for such a Farm would then be 10%. As explained below, an Agent (other than Agent X) may want to avoid Farms having a dominant Agent having more a certain percentage of the active listing (too hard to break into the market). Farms having a computed competition percentage greater than the User selected maximum 144A may not be included in the Farm list report.

In another embodiment, the competition percentage for an agent may be a weighted combination of three factors: a. listing %, b. transaction %, and c. market share %. An agent's listing % may be ratio of the number of listings (for sale of a property) an agent had in a predetermined time interval divided by the total number of listings in the same time interval. An agent's transactions % may be ratio of the sum of the number of sales (from listings of a property) and the number of buyers (for purchase of a property) an agent had in a predetermined time interval divided by the total number of transactions (each property sale representing two transactions—listing agent, buyer's agent) in the same time interval. The market share % for an agent may be equal to sum of all the sales (sales price) in the time interval (where the agents represented the buyer or seller) divided by two times the sales volume (cumulative sales price) in the same time interval. All these calculations are applied to properties in a particular Farm being evaluated. In an embodiment, the competition percentage for an agent may be equal to the sum of 25% of the listing %, 50% of the transaction %, and 25% of the market share %.

In another embodiment, other factors may affect the competition % calculation. The dominant agent may be determined for a Farm along with the number of years the Agent has been the dominant or top agent. This value may be used as part of the competition % calculation. Similarly, when such a dominant agent leaves the area (no longer represents properties in the Farm), the competition % may be adjusted to limit their effect. Further, the competition % may vary based on the number of years that a Farm has had any agent having greater than predetermined percentage of the competition %, e.g., the Farm has had an agent representing 5 or more % of the calculated competition % for 3 or more years.

As shown in FIG. 6D, a User 61 via their system 60 may also be able to set a Farm's minimum velocity percentage (for inclusion in the Farm list). In an embodiment, a Farm's velocity percentage is equal to the number of properties sold in a predetermined time interval divided by the total number of properties in the Farm. In an embodiment, the time interval may be twelve months. For example, if 10 properties have been sold in the last twelve months in a Farm including 100 properties, the velocity percentage for the Farm would be 10%. Once a User 61 has entered their desired filters, they may forward their selections to the RESPA system 50 by selecting the generate report icon 148D (communication 312 in FIG. 2).

Figures 4, 5:
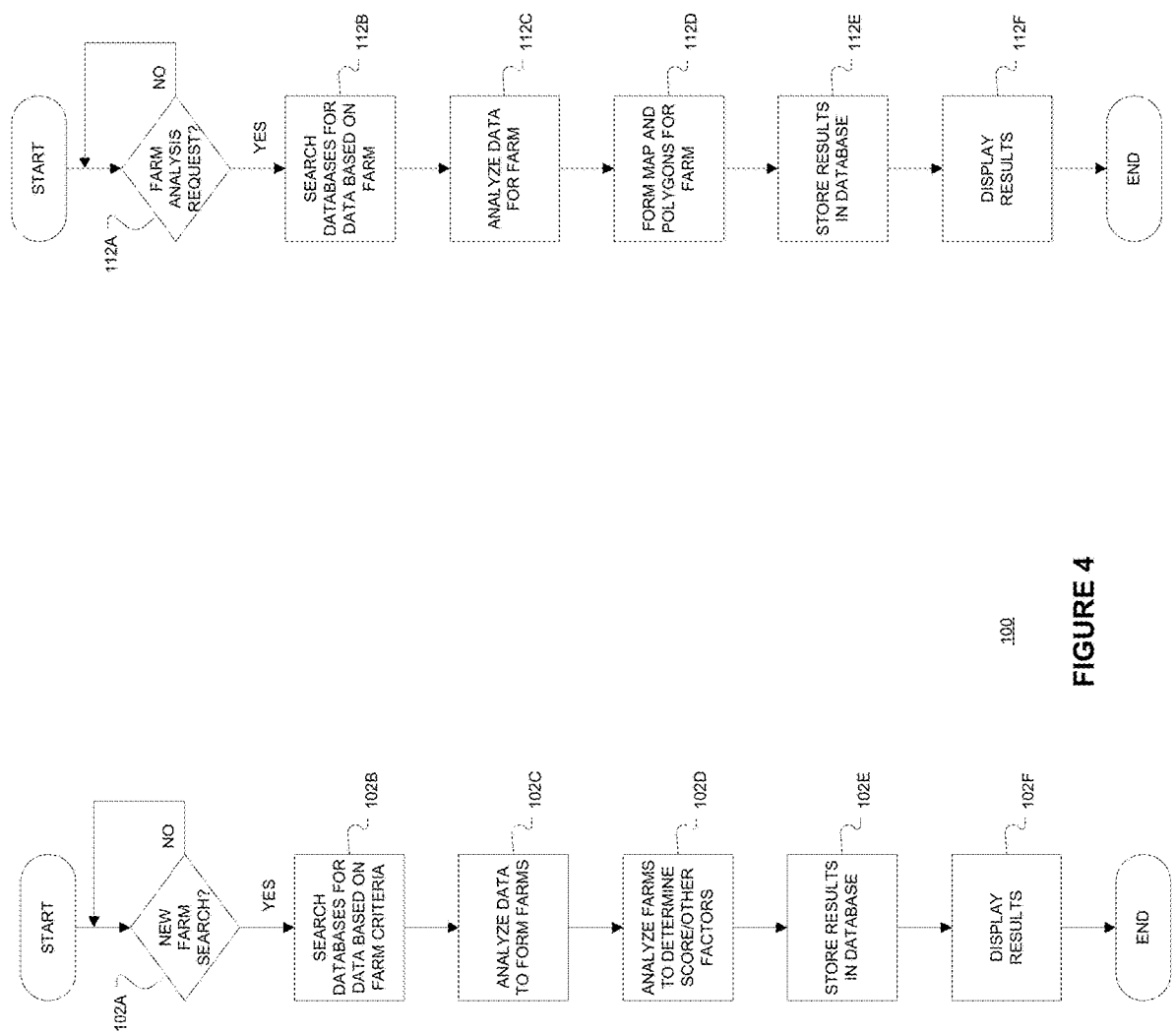
FIGS. 4 and 5 are flow diagrams illustrating several methods according to various embodiments.

In an embodiment, a RESPA system 50 may employ the algorithm 100 shown in FIG. 4 once a User 61 selects the generate report icon 148D (communication 312 in FIG. 2) (new Farm search activity 102A—FIG. 4). As shown in FIG. 4, a RESPA system 50 may use the filter selections 128D-146D to search RESPR DB 40A-C provided data (52 of FIG. 3) or local data (56 of FIG. 3) for properties meeting the filters (activity 102B). The resultant properties may be analyzed to form Farms based on the selected Farm types (activity 102C). The resultant Farms may be then be analyzed to determine their respective Farm scores (activity 102D). In an embodiment, a Farm's "score" may be equal to a weighted combination of five attributes including: a. Farm's velocity percentage; b. average property Price of listed, sold, or all properties in a Farm; c. Competition percentage for Farm; d. Competition group percentage for Farm (described below), and e. average days on market for active properties in the Farm. The five factors may each represent 20% of a calculated Farm score where each has a weighted value of 0 to 1 based on historical averages, comparisons to other Farms in a region, and other factors of the five attribute values. Accordingly, the maximum Farm score could be 5, where each weighted value is about 1. The Farm score may be rounded to an integer value from 1 to 5 in an embodiment. See FIG. 6F, box 131F for an example of such factors and weighting according to an embodiment.

In an embodiment, the competition group percentage for a Farm is equal to sum of the competition percentages for a predetermined number of top agents. For example, Agents X, Y, and Z may represent 35% of the total competition percentage (as described above) of all agents of properties for a Farm. An Agent (other than Agents X, Y, and Z) may want to avoid Farms having several dominant Agents representing more than a certain computed competition percentage of a Farm (too hard to break into the market). In an embodiment, the group competition percentage may be determined based on the top five agents in the Farm, i.e., equal to the sum of the calculated competition percentage for the top, five agents in a farm.

Figure 6E:
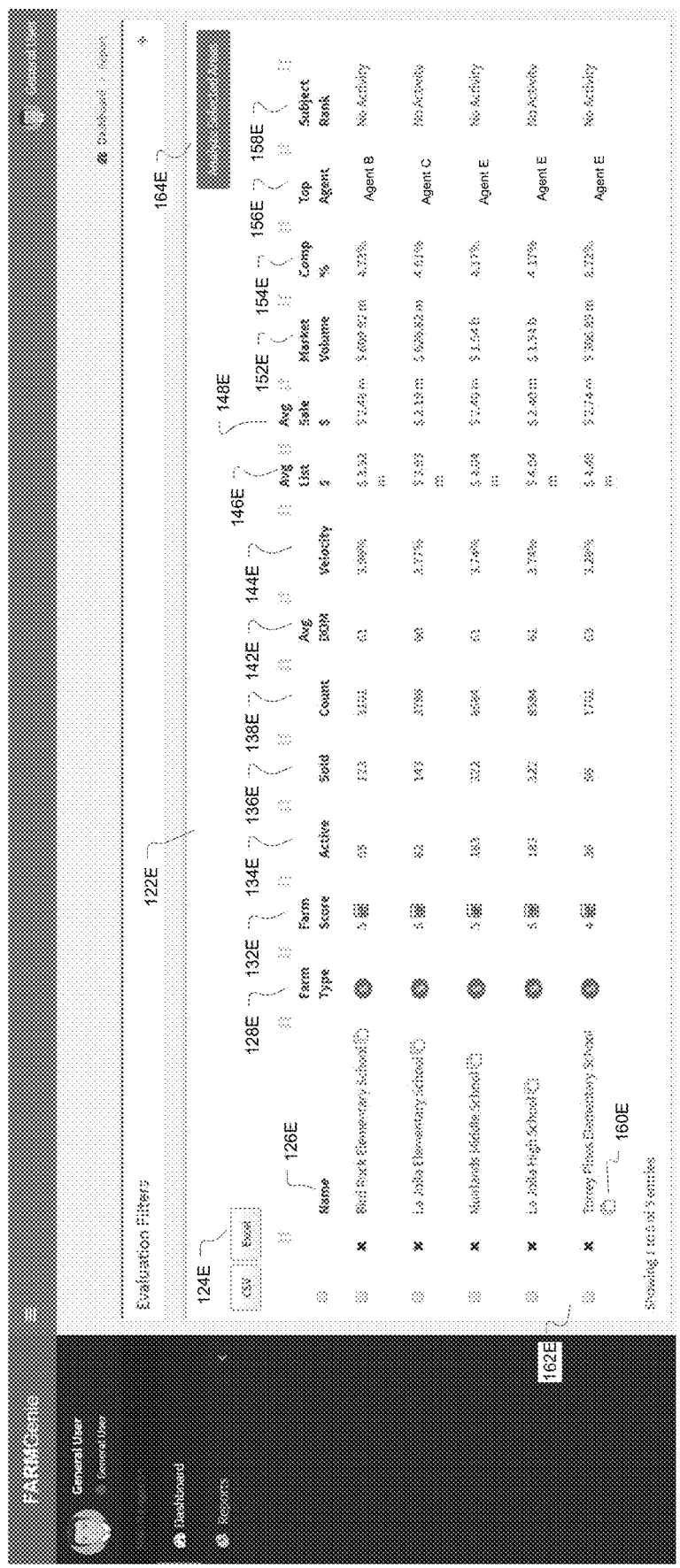
FIG. 6E illustrates a Farms list graphical user interface (GUI) display showing a Farms list report including various Farms and analysis located based on the selected filters according to various embodiments.

A RESPA system 50 may also determine other factors, characteristics, or variables as shown in FIG. 6E. The determined Farms and factors may be stored in a database (56 of FIG. 3) (activity 102E) and the results displayed (activity 102F) as shown in FIG. 6E. FIG. 6E illustrates a Farms list graphical user interface (GUI) display 120E showing a Farms list report including Farms meeting the selected filters of interfaces 102A-102D and analysis according to various embodiments. As shown in list 122E of FIG. 6E, five Farms met the criteria of the filters shown in FIGS. 6A-6D. For each Farm, the list 122E includes the Farm name 126E, Farm type 128E (from FIG. 6C, first letter of Farm type), the Farm score 132E, number of active properties (for sale) 134E, number of properties sold in a predetermined time interval (12 months in one embodiment) 136E, total number of properties—count 138E, average days on market (DOM) for active properties 142E, velocity % 144E, average listing price (for active properties) 146E, average sales price for properties sold in the predetermined time interval 148E, market volume (sum of sales price for properties sold in the predetermined time interval) 152E, competition $% 154E, top Agent for active properties 156E, and subject rank representing the requesting Agent's (128A of FIG. 6A) activity in the Farm 158E.

FIG. 3 is a system diagram of an RESPA architecture 10 including an application user computer system 60, a RESPA system 50, RESPR database systems 40A, 40B coupled to a network 16 (e.g., the Internet), and RESPR database system 40C coupled to RESPA system 50. An application user 61 may use the computer system 60 to generate Farm lists and reports via a RESPA system 50. A RESPR DB system 40A, 40B, 40C may provide real estate data via requests, adapters, or interfaces 42A-C from a RESPA system 50. The system 60 may include interfaces to communicate with a server 54 on the RESPA system 50. In an embodiment, a system 60 may include a browser application 68 that resides on the computer system 60 and the server 54 may be a web-server 54 that generates browser displayable content such as hypertext markup language (HTML). In an embodiment, the web-server 54 may employ a web framework (WF) or web application framework (WAF) to generate browser displayable content. In another embodiment, a RESPA system 50 may generate content to be displayed by an application resident on the computer system 60.

A RESPA system 50 may include the web-server module 54, a data source processor module 59, a data analysis module 58, an applications database/table 56, and a RESPA database 52. The applications database 56 may store information about the application users, backup of RESPA and RESPR data or content from external databases. The RESPA database 52 may include located, received, or scraped RESPR content and data, analyzed data, and related statistical information. The databases 52, 56 may employ Greenplum (www.greenplum.com), Hadoop (hadoop.apache.org) HTTP Filer Server (HFS), PostgreSQL (www.postgresql.org) software, and other software and hardware to maintain the databases 52, 56. The system 50 may also store data on one or more cloud clusters or distributed systems.

The data source process module 59 may include one or more software programs specific to one or more RESPR data formats including, but not limited to MLS data, tax collector data, title company data, and bank data. A RESPR DB 40A-40C may provide algorithms to enable a RESPA SYSTEM 50 to request, receive, and process RESPR DB content. The data analysis module 58 may analyze data or content provided by a RESPR DB 40A-40B and stored locally 52, 56. The data analysis module 58 may include $3^{rd}$ party data analytic software or hardware. In an embodiment, the data analysis module 58 may also format received RESPR DB content or data to a format for storage in a RESPA system 50 database 52, 56.

In FIG. 3 an application user 61 via a computer system 60 may display a Farm list (as shown in FIG. 6E) via the browser application 68. The web-server 54 may populate an HTML file 69 with RESPR Farm data provided by the database 52. The web-server 54 may forward the HTML file 69 to the application user computer system 60 via the network 16. The browser application 68 may generate the Farm list display 20 (such as 120E in FIG. 6E) in a user perceptible format.

Similar to interface 120E in FIG. 6E, display 20 may include the Farm list 22. Each Farm may include a select field 29A to C, the Farm name 24A, Farm score 26A, competition % 28A, and other values. A User 61 via interface 20 may also be able to request a detailed Farm report via the analyze icon/button 23.

Figure 6F:
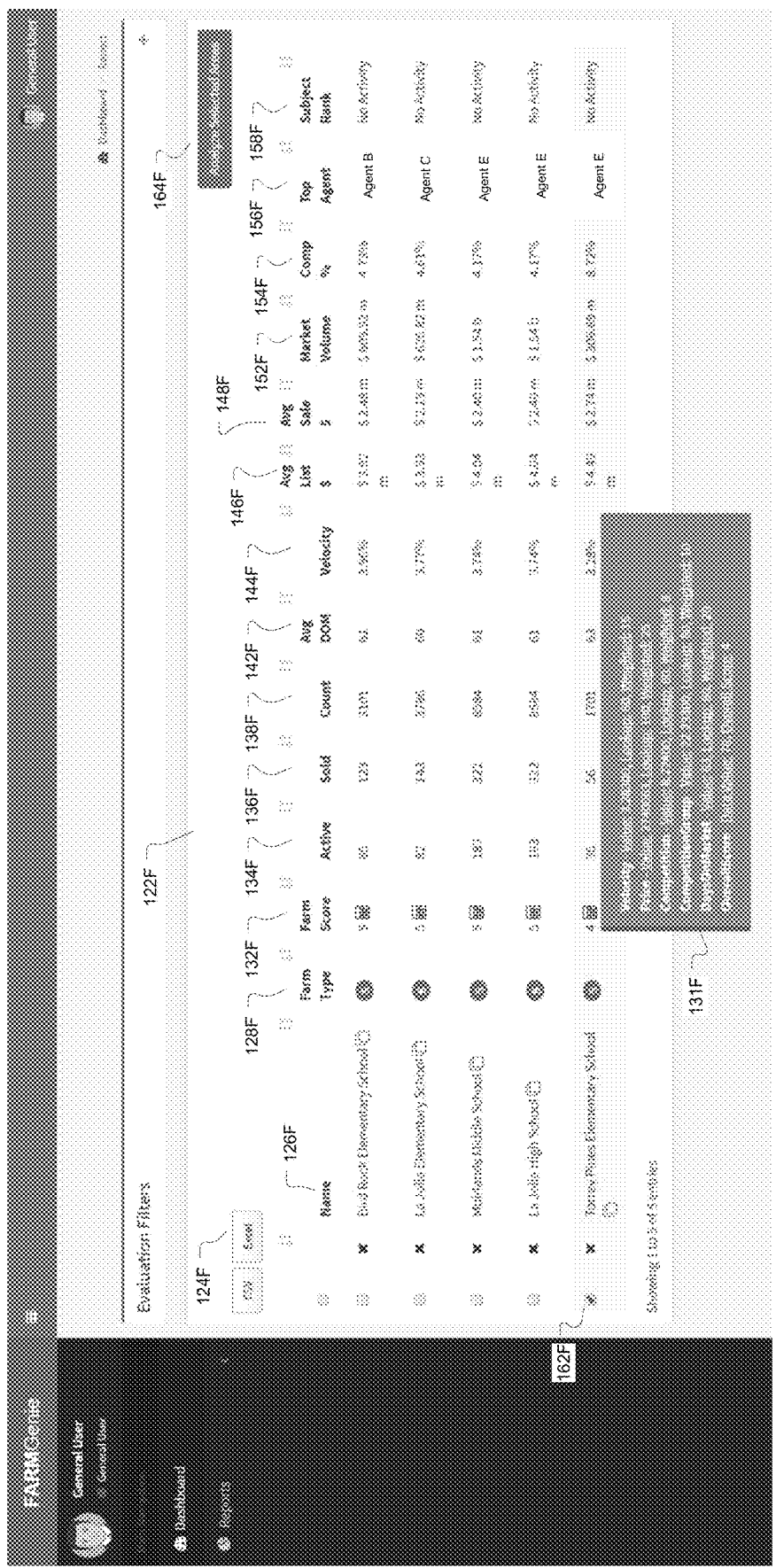
FIG. 6F illustrates a Farms list graphical user interface (GUI) display showing a Farms list report including various Farms and analysis including details of factors used to determine a Farm score and a single Farm selected for further/additional analysis according to various embodiments.

As shown in FIG. 6E, a User 61 via interface 120E may be able to download the Farm list in various formats including comma separated values (CSV) and Excel 124E. A User 61 via interface 120E may also be able to view a map of the Farm properties 160E. By hovering over a Farm score 132E in the list 122E, a User 61 may be able to view Farm score details such as shown in FIG. 6F 131F. A User 61 may be able to select one or more Farms via boxes 162F to be further analyzed via icon 164F.

A RESPA system 50 may employ the algorithm 110 shown in FIG. 5 when a User 61 requests a detailed Farm analysis report (activity 112A). A RESPA system 50 may collect, search, request, or process additional real estate data via RESPR DB systems 40A-C and internal data 52, 56 for a selected Farm (activity 112B). A RESPA system 50 may also analyze the additional data as needed for the detailed report as described with reference to FIGS. 6G to 6N (activity 112C). A RESPA system 50 may also form a geographical region encompassing all the properties of the Farm including polygons about the combined properties area (activity 112D). A RESPA system 50 may store the results (data, maps, analytics) in a database 52, 56 (activity 112E) and display the results via interfaces 120G to 120N of FIGS. 6G to 6N. In an embodiment, the interfaces 120G to 120N form a single display with many segments that a User 61 may scroll through via a web browser application 62, 68.

Figure 6G:
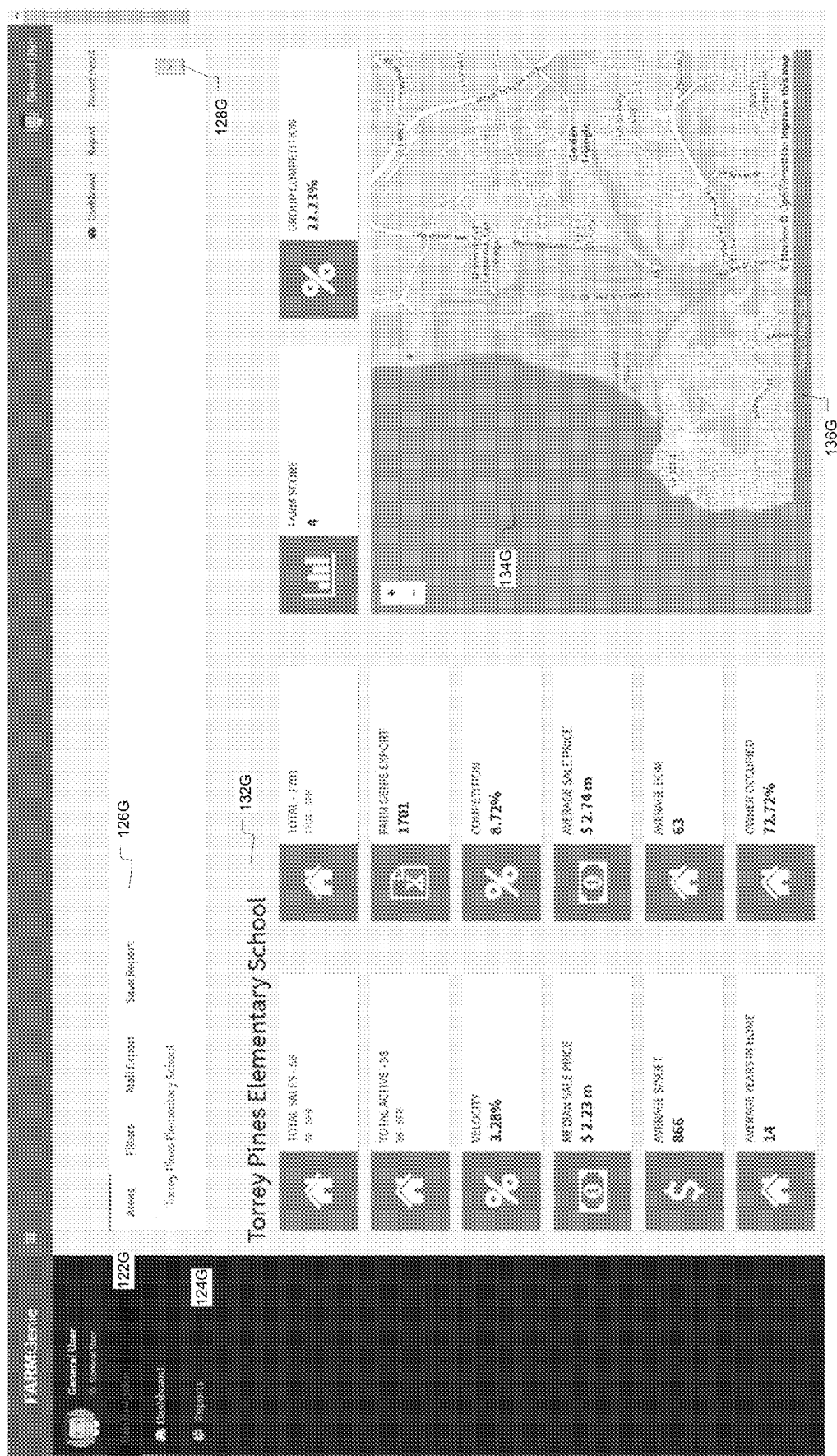
FIG. 6G illustrates a Farm Report graphical user interface (GUI) display showing a first segment of a single Farm analytic report including calculated analytics and map of Farm geographical region according to various embodiments.

FIG. 6G illustrates a Farm Report graphical user interface (GUI) display 120G showing a first segment of a single Farm analytic report including calculated analytics 132G and a map 134G of Farm properties according to various embodiments. As shown in FIG. 6G, the analytics may include some calculations or facts previously provided. The analytics 132G may include the average cost per square foot for properties sold in a predetermined time interval (12 months in an embodiment), owner occupied percentage for all properties as known by available data. The display 120G also includes a map 134G including a highlighted polygon encompassed all the properties of the Farm.

Figure 6I:
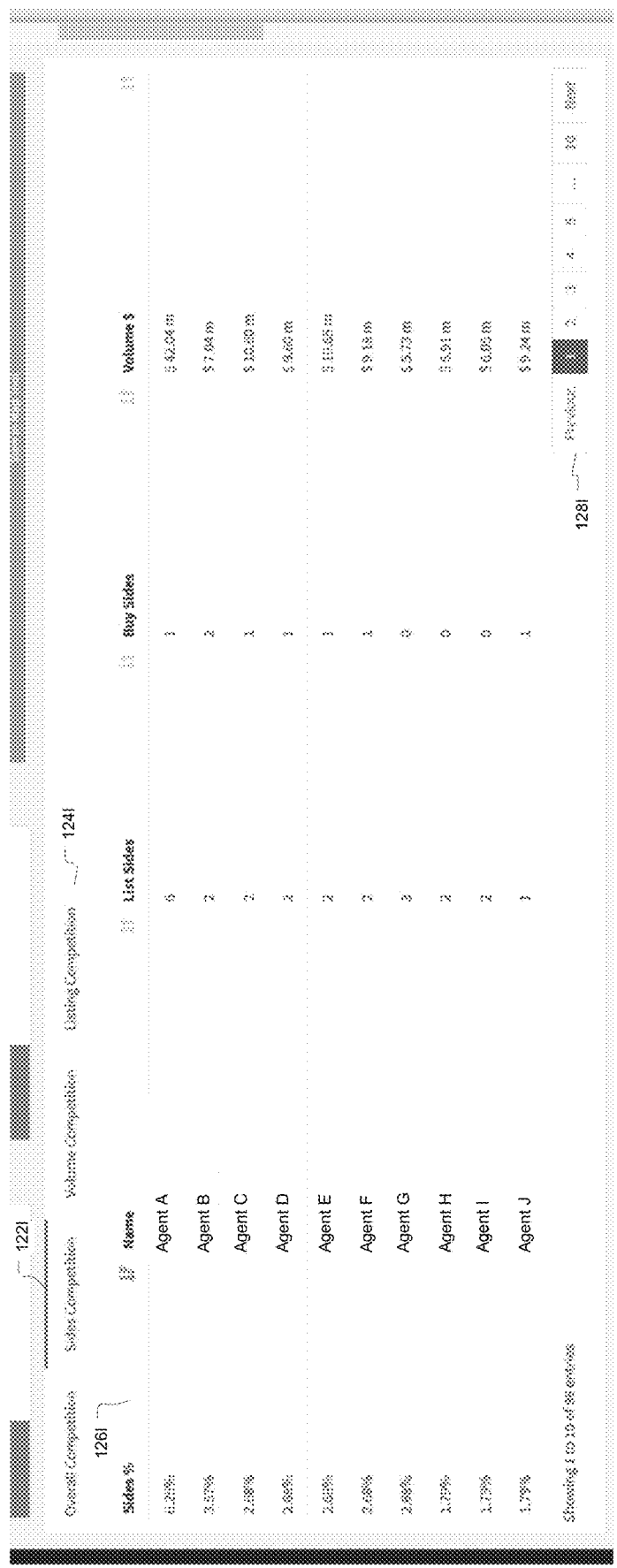
FIG. 6I illustrates a Farm Report graphical user interface (GUI) display showing a second segment, second tab of a single Farm analytic report including real estate agents sides competition according to various embodiments.
Figure 6K:
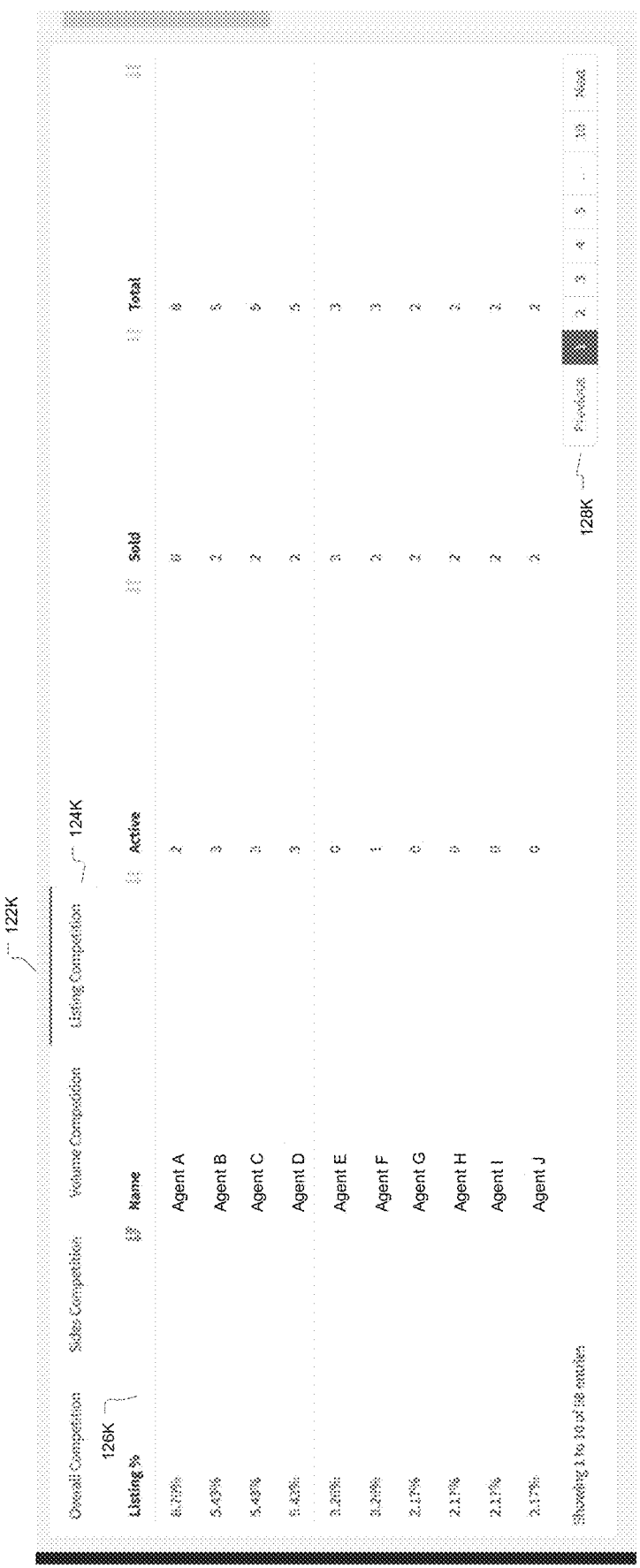
FIG. 6K illustrates a Farm Report graphical user interface (GUI) display showing a second segment, fourth tab of a single Farm analytic report including real estate agents listing competition according to various embodiments.
Figure 6L:
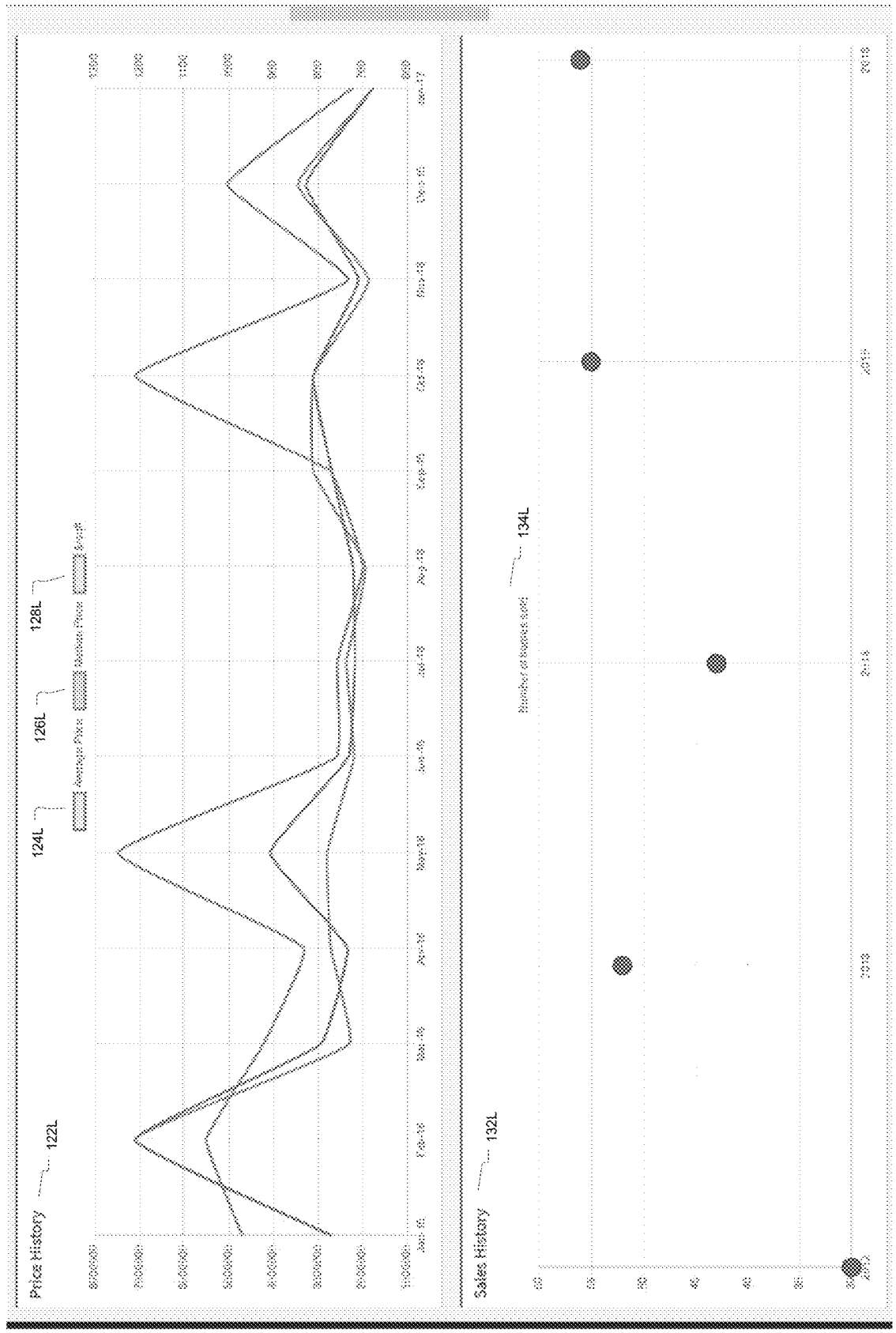
FIG. 6L illustrates a Farm Report graphical user interface (GUI) display showing a third and a fourth segment of a Farm report including a price history line chart and sales history chart for Farm properties according to various embodiments.
Figure 6M:
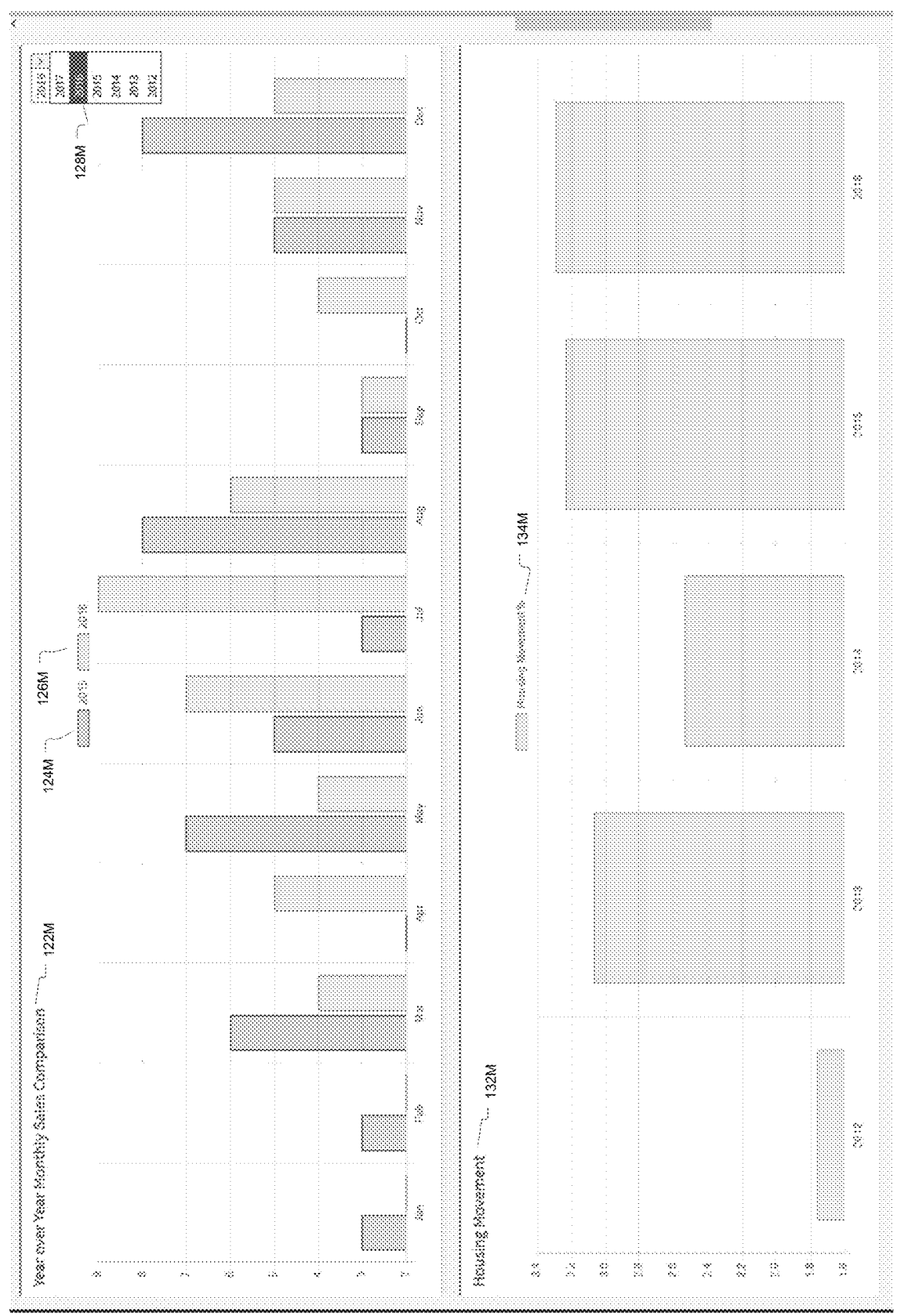
FIG. 6M illustrates a Farm Report graphical user interface (GUI) display showing a fifth and a sixth segment of a Farm report including a year over year selectable bar chart and housing movement bar chart for Farm properties according to various embodiments.
Figure 6N:
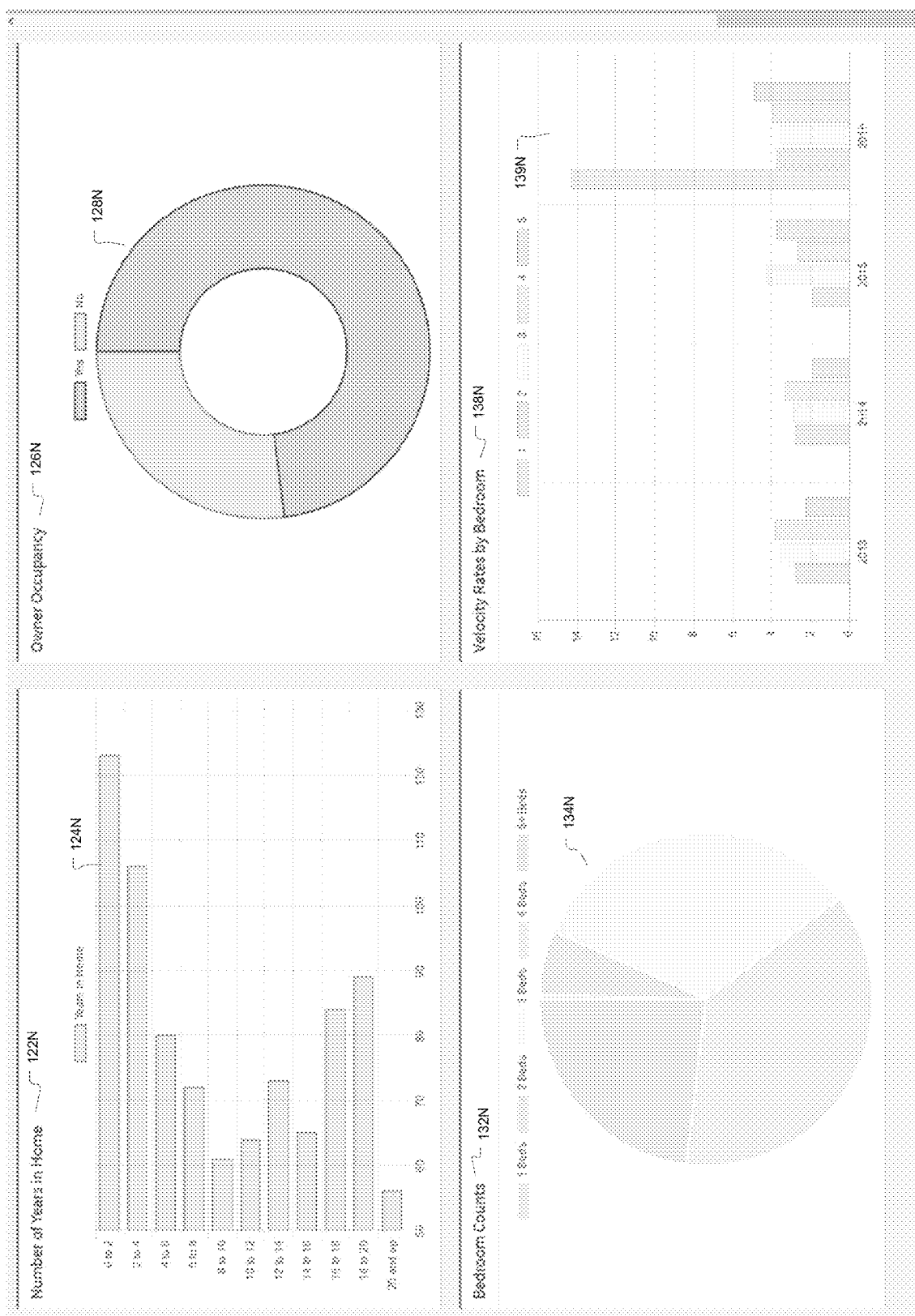
FIG. 6N illustrates a Farm Report graphical user interface (GUI) display showing a seventh to tenth segments of a Farm report including a number of years in home bar chart, an owner occupancy percentage pie chart, a bedroom counts percentage pie chart, and a velocity rates by bedrooms bar chart for Farm properties according to various embodiments.
Figure 6O:
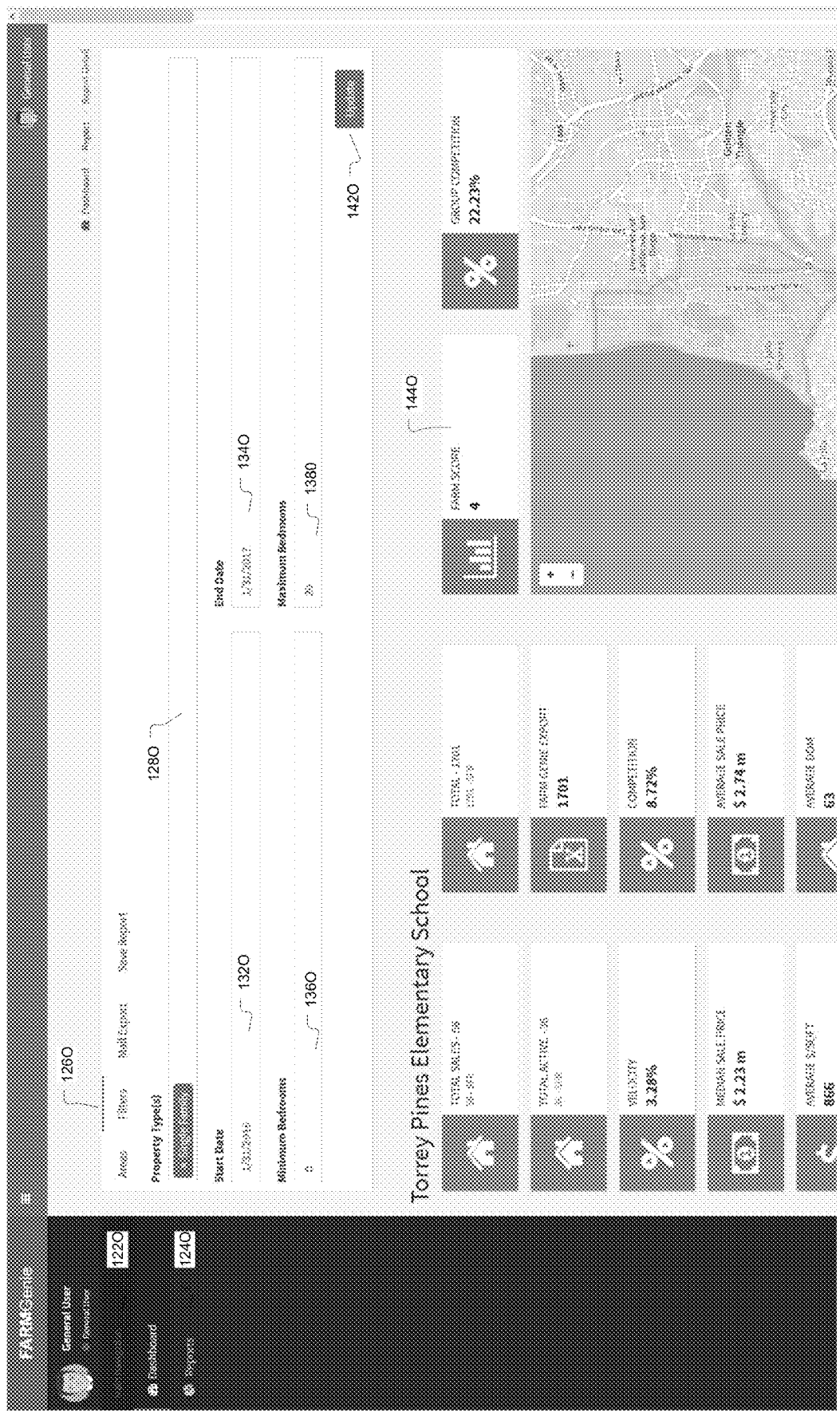
FIG. 6O illustrates a Farm Report graphical user interface (GUI) display showing a portion of the first segment of a single Farm analytic report and a filter tab filter options that may be employed to refine the Farm report according to various embodiments.
Figure 6P:
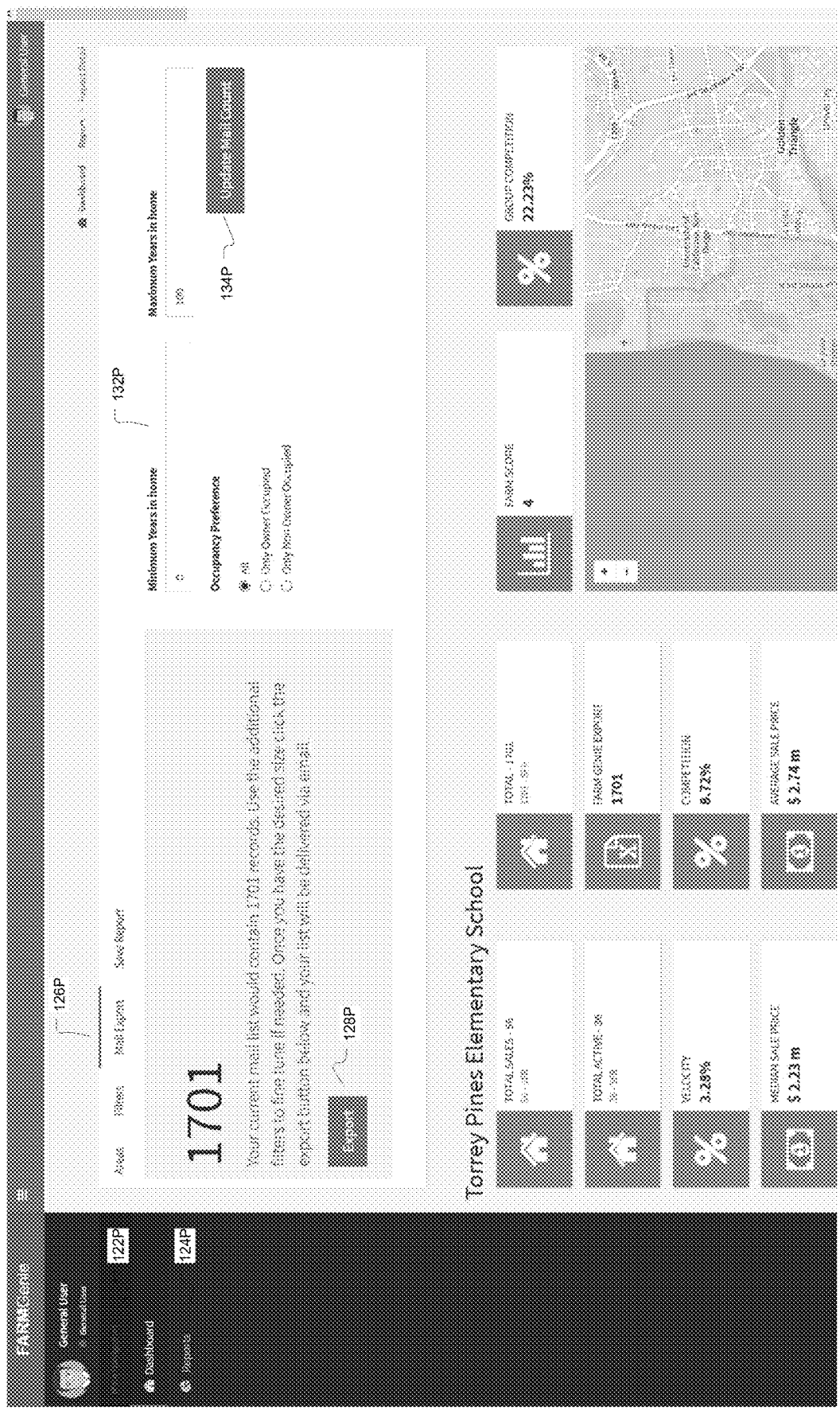
FIG. 6P illustrates a Farm Report graphical user interface (GUI) display showing a portion of the first segment of a single Farm analytic report and a mail export tab that may be employed to export the Farm report according to various embodiments.

As also in FIG. 6G, several User selectable control options are present 126G including further filtering, mail export results, and saving the reports as shown in interfaces 120O and 120P of FIGS. 6O and 6P. When a User selects several Farms via boxes 162E of FIGS. 6E and 6F, the User 61 may be able to switch to a different Farm report via a pull down interface 128G.

Figure 6Q:
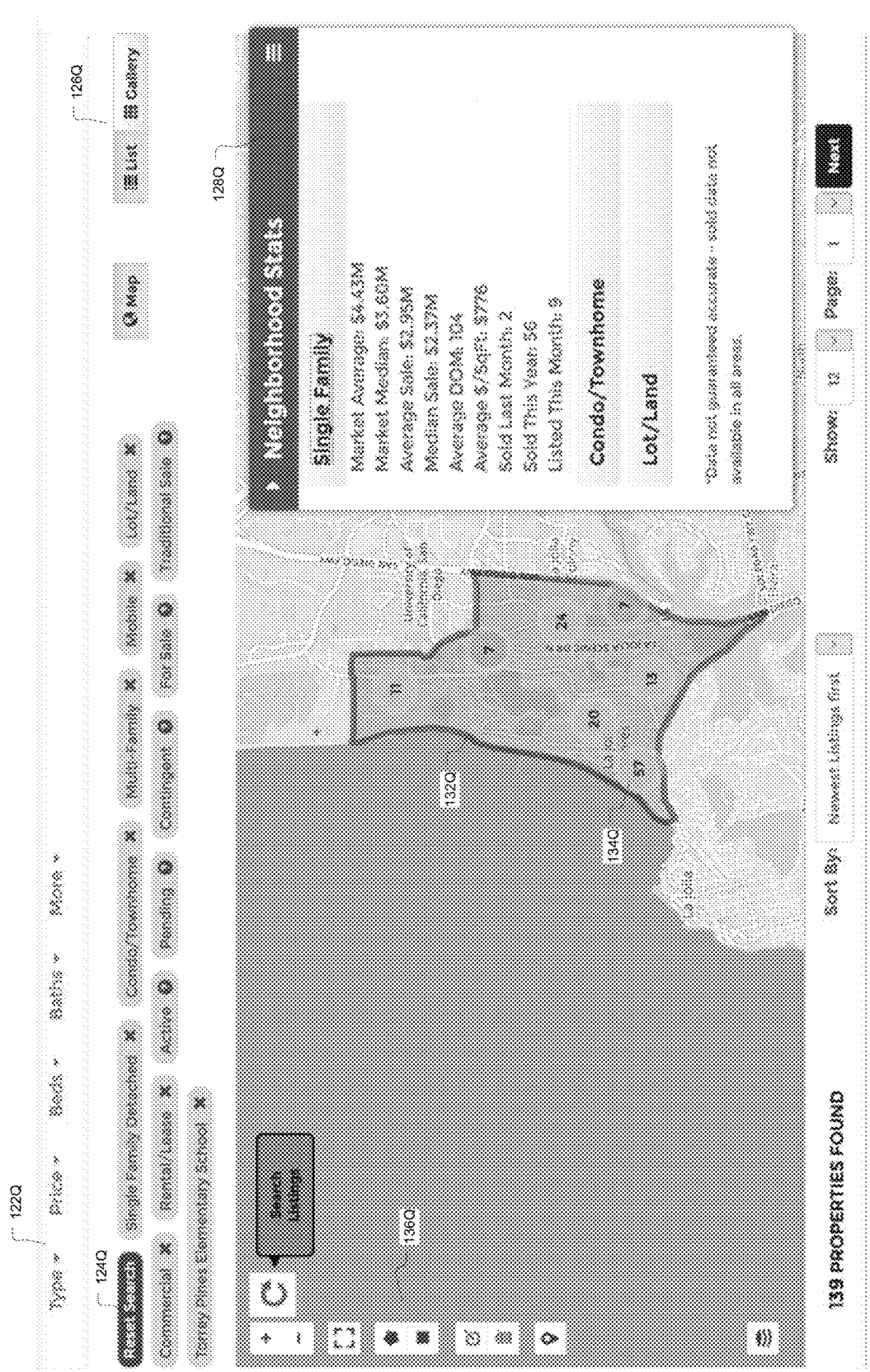
FIG. 6Q illustrates a Farm Map tool graphical user interface (GUI) display of a first segment or section showing a map including a geographical region representing a Farm and icons representing properties or groups of properties of a Farm according to various embodiments.
Figure 6R:
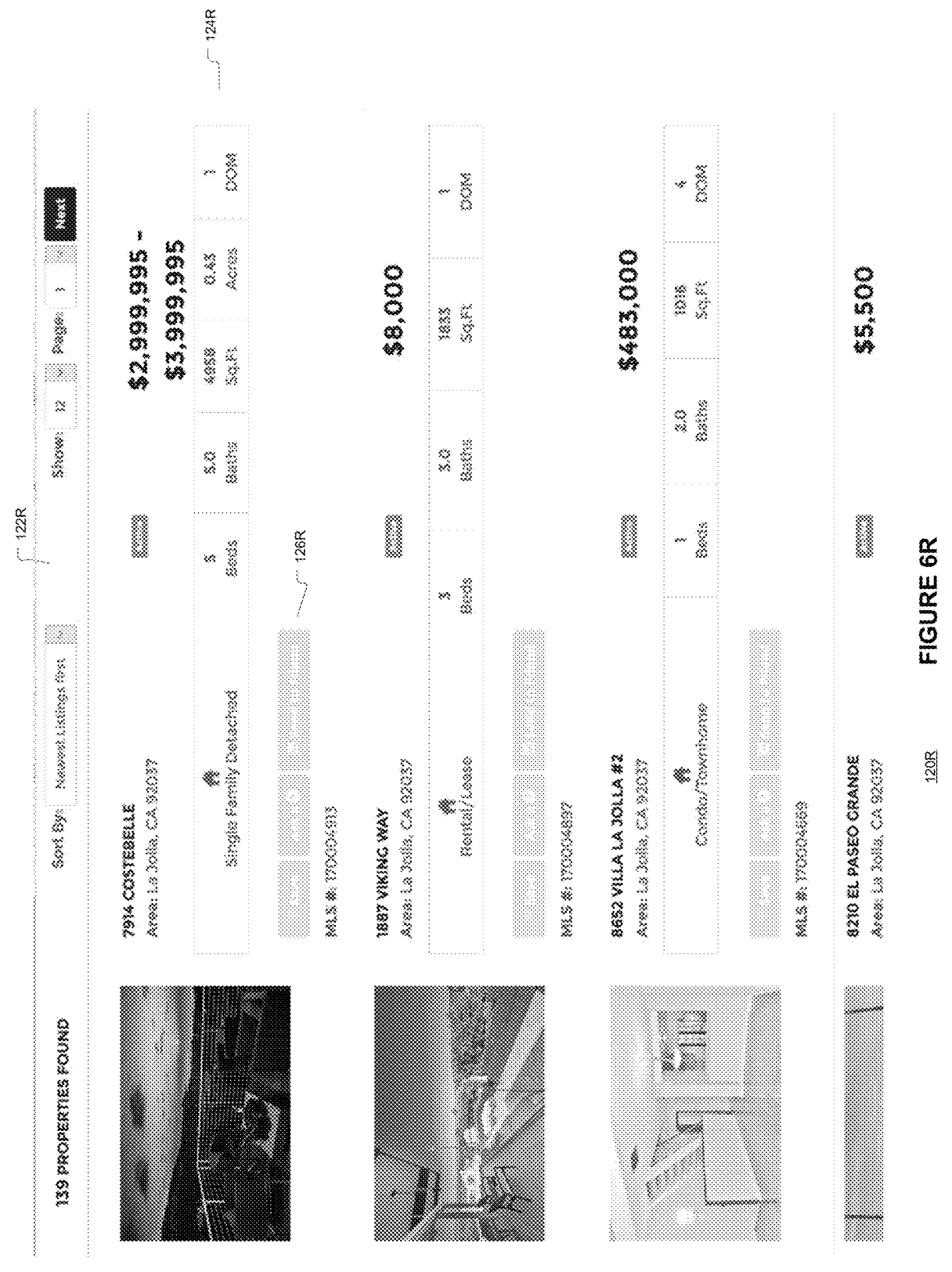
Figure 6S:
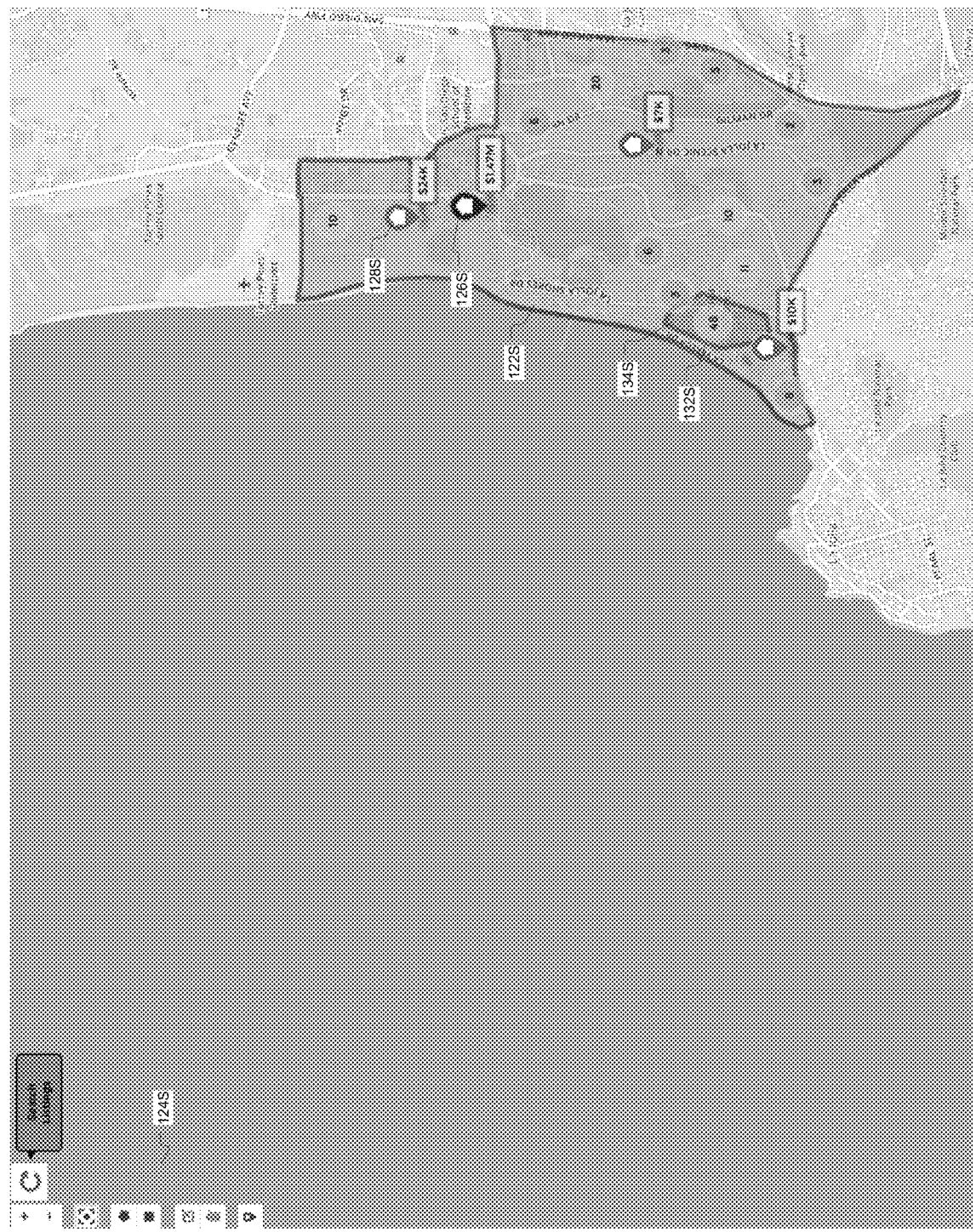
FIG. 6S illustrates a Farm Map tool graphical user interface (GUI) display of an enlarged portion of the first segment or section showing a more detailed map including a geographical region representing a Farm and icons representing properties or groups of properties of a Farm according to various embodiments.
Figure 6T:
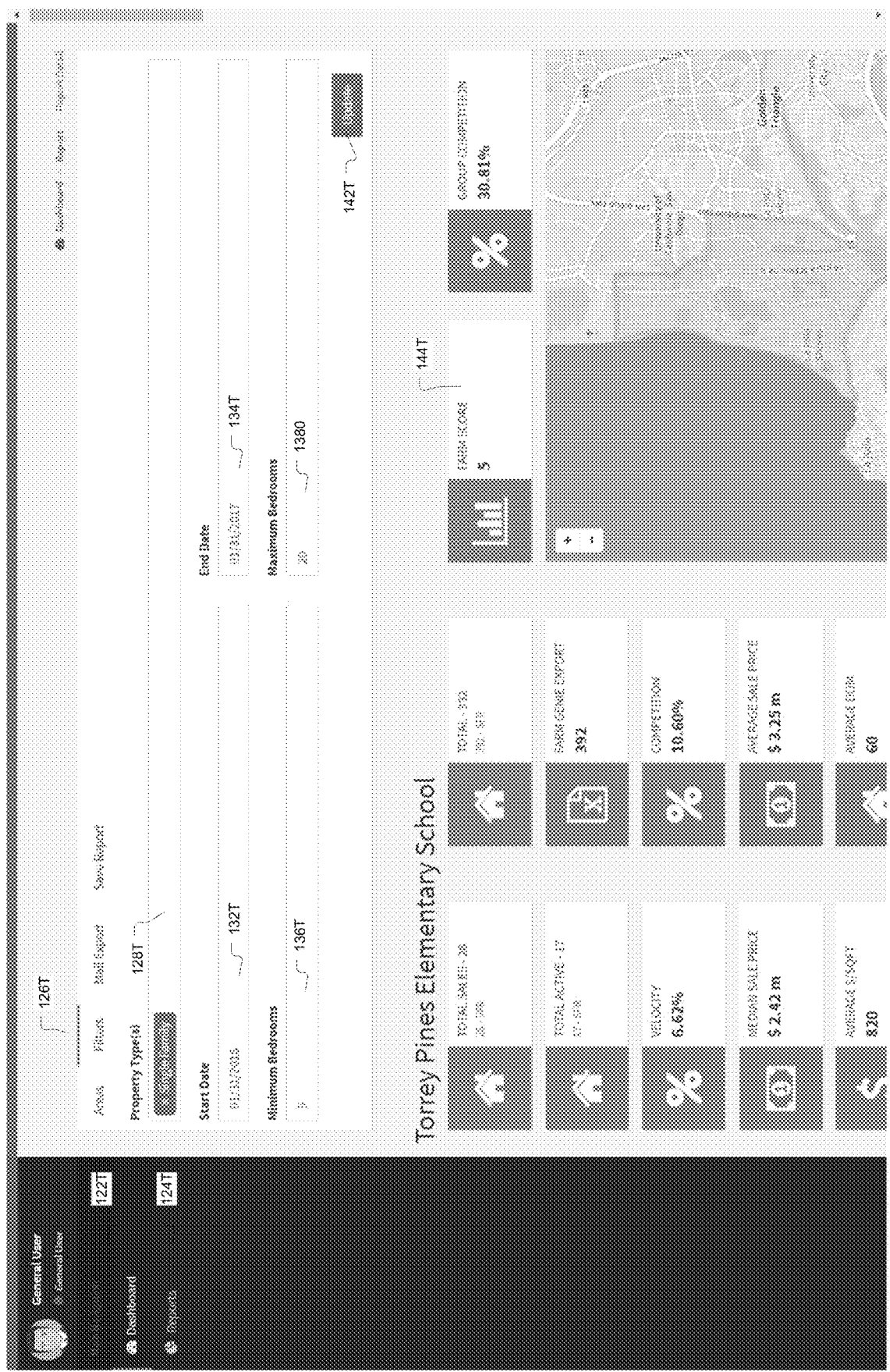
FIG. 6T illustrates a Farm Report graphical user interface (GUI) display showing a portion of the first segment of a single Farm analytic report and after a filter tab filter option update has been employed to refine the Farm report according to various embodiments.

FIG. 6O illustrates a Farm Report graphical user interface (GUI) display 120O showing a portion of the first segment of a single Farm analytic report and Filter tab options 126O that may be employed by a User 61 to refine a Farm according to various embodiments. As shown in FIG. 6O, a User 61 may select or modify property types 128O, a property's listing start date 132O and end date 134O, minimum number of bedrooms 136O, and maximum number of bedrooms 138O. A User 61 may create a new Farm and analytics by selecting one or more filter parameters and selecting update icon 142O. Via the Filter options 126O, a User 61 may be able to change Farm property characteristics and monitor the analytic data changes including the Farm score 144O. For example as shown in FIG. 6T, a User has selected the minimum of bedrooms 136T to be at least 5. The updated Farm has an increased Farm score 144T of 5 as shown in FIG. 6T.

FIGS. 6H to 6K illustrate several Farm Report graphical user interface (GUI) displays 120H to 120K showing a second segment with four tabs each providing analytic data related to active real estate agents in the Farm according to various embodiments. FIG. 6H illustrates a Farm Report graphical user interface (GUI) display 120H showing the second segment, first tab 122H of a single Farm analytic report including analytics 126H of overall competition of active real estate agents in the Farm according to various embodiments.

FIG. 6I illustrates a Farm Report graphical user interface (GUI) display 120I showing the second segment, second tab 122I of a single Farm analytic report including analytics 126I of sides (buying and listing sides of a deal) competition of active real estate agents in a Farm according to various embodiments. FIG. 6J illustrates a Farm Report graphical user interface (GUI) display 120J showing the second segment, third tab 122J of a single Farm analytic report including analytics 126J of volume competition of active real estate agents in a Farm according to various embodiments. FIG. 6K illustrates a Farm Report graphical user interface (GUI) display 120K showing the second segment, fourth tab 122K of a single Farm analytic report including analytics 126K of listing competition of active real estate agents of a Farm according to various embodiments. In each tab 122H-K, additional agents may be displayed via row controls 128H-K, respectively.

FIG. 6L illustrates a Farm Report graphical user interface (GUI) display showing a third 122L and a fourth segment 132L including a price history line charts 124L-128L and a sales history chart 134L for Farm properties according to various embodiments. FIG. 6M illustrates a Farm Report graphical user interface (GUI) display 120M showing a fifth 122M and a sixth 132M segment including a year over year selectable 128M bar charts 124M, 126M and a housing movement bar chart 134M for Farm properties according to various embodiments. FIG. 6N illustrates a Farm Report graphical user interface (GUI) display 120N showing seventh to tenth segments 122N, 126N, 132N, and 138N including a number of years in home bar chart 124N, an owner occupancy percentage pie chart 128N, a bedroom counts percentage pie chart 134N, and a velocity rates by bedrooms bar chart 139N for Farm properties according to various embodiments.

As shown in FIGS. 6A and 6G, a User 61 may be able to invoke a Map Tool 125A, 136G to view properties in Farms or a Farm via a graphical interface. FIG. 6Q illustrates a Farm Map tool graphical user interface (GUI) display 120G including a scrollable display with a first segment 120Q including a map section 136Q including a geographical region 132Q representing a Farm's properties and icons 134Q representing properties or groups of properties of a Farm according to various embodiments and a second segment 120R (FIG. 6R) including details about each property of the Farm. As shown in FIG. 6Q, the interface 120Q may represent the map for the Farm shown in FIG. 6E and selected via icon or button 136G. As shown in FIG. 6Q, the Map tool interface 120Q includes additional filters 122Q, search icons and reset options 124Q, different view options 126Q, map area 136Q, and a neighborhood statistics summary page 128Q.

As shown in FIG. 6R, the Farm Map tool graphical user interface (GUI) display second segment 120R may show details 126R of each property of a Farm according to various embodiments. Via interface 120Q of FIG. 6Q, a User may select to enlarge the map area to show more details of the Farm properties in geographical representation. FIG. 6S illustrates a Farm Map tool graphical user interface (GUI) display 120S of an enlarged portion of the first segment or section 120Q showing a more detailed map 124S including a geographical region 122S representing a Farm and icons 126S, 128S, 132S representing properties or groups of properties of a Farm according to various embodiments. In an embodiment, grouped properties of less than 10 properties have a green circle icon with the number of properties, grouped properties of more than 10 properties have a yellow circle icon with the number of properties 132S, a blue house icon 126S representing a property for sale along with the sales price, and a red house icon representing a property for rent including the rental price. The polygon 134S represents the boundaries of the 48 properties of the yellow circle 132S in an embodiment.

Figure 7B:
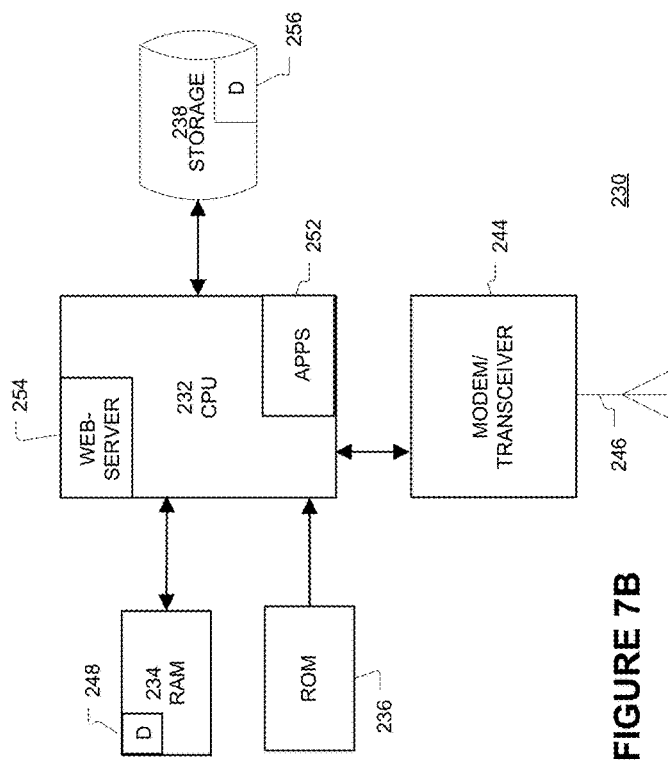
FIG. 7B is a block diagram of an article according to various embodiments.
Figure 7A:
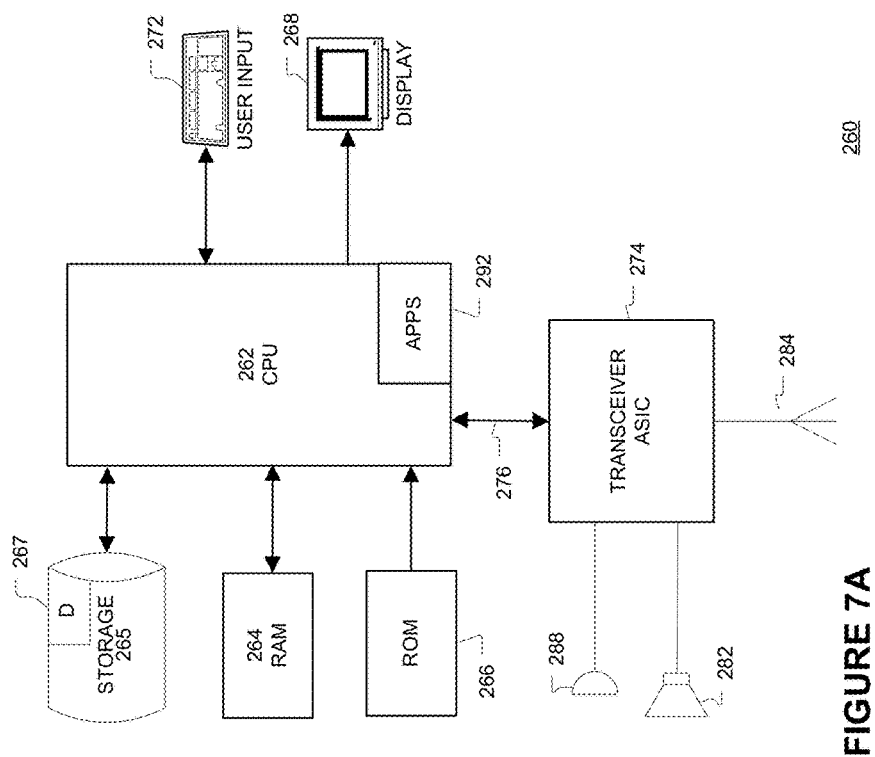
FIG. 7A is a block diagram of an article according to various embodiments.

A device 260 is shown in FIG. 7A that may be used in various embodiments as an application user system 60. The device 60 may include a central processing unit (CPU) 262, a random access memory (RAM) 264, a read only memory (ROM") 266, a display 268, a user input device 272, a transceiver application specific integrated circuit (ASIC) 274, a microphone 288, a speaker 282, a storage unit 265, and an antenna 284. The CPU 262 may include an application module 292 including a browser application module. The RAM 264 may store RESPA system 50 provided content including HTTP data.

In an embodiment, the applications 292 may be a separate module. The application module 292 may process messages, displays, or pages from and generate messages, display, responses, or pages for the RESPA system 50 web-server 54. The storage 265 may store data provided by the RESPA system 50 web-server 54 in a database 267. The storage device 265 may comprise any convenient form of data storage and may be used to store temporary program information, queues, databases, and overhead information.

The ROM 266 may be coupled to the CPU 262 and may store the program instructions to be executed by the CPU 262, and the application module 292. The RAM 264 may be coupled to the CPU 262 and may store temporary program data, and overhead information. The user input device 272 may comprise an input device such as a keypad, touch screen, track ball or other similar input device that allows the user to navigate through menus, displays in order to operate the device 260. The display 268 may be an output device such as a CRT, LCD, touch screen, or other similar screen display that enables the user to read, view, or hear received messages, displays, or pages from the RESPA system 50 web-server 54.

A microphone 288 and a speaker 282 may be incorporated into the device 260. The microphone 288 and speaker 282 may also be separated from the device 260. Received data may be transmitted to the CPU 262 via a bus 276 where the data may include messages, displays, or pages received, messages, displays, or pages to be transmitted, or protocol information. The transceiver ASIC 274 may include an instruction set necessary to communicate messages, displays, or pages in architecture 10. The ASIC 274 may be coupled to the antenna 284 to communicate wireless messages, displays, or pages within the architecture 10. When a message is received by the transceiver ASIC 274, its corresponding data may be transferred to the CPU 262 via the bus 276. The data can include wireless protocol, overhead information, and pages and displays to be processed by the device 260 in accordance with the methods described herein.

FIG. 7B illustrates a block diagram of a device 230 that may be employed as a RESPA system 50 and RESPR DB system 40A, 40B, 40C in various embodiments. The device 230 may include a CPU 232, a RAM 234, a ROM 236, a storage unit 238, a modem/transceiver 244, and an antenna 246. The CPU 232 may include a web-server 254 and application module 252. The RAM 234 may include a queue or database 248 where the database 248 may be used to store information including real estate data, streams, related data, and statistics. The storage 238 may also include a queue or database 256 where the database 256 may be used to store real estate set or subset information. In an embodiment, the web-server 254 and the application module 252 may be separate elements. In an embodiment, the web-server 254 may generate content for web-pages or displays to be forwarded to an application user system 60.

The modem/transceiver 244 may couple, in a well-known manner, the device 230 to the network 16 to enable communication with a RESPR DB system 40A, 40B, 40C and an application user system 60. In an embodiment, the modem/transceiver 244 may be a wireless modem or other communication device that may enable communication with a RESPR DB system 40A, 40B, 40C, and an application user system 60. The CPU 232 via the web-server 254 may direct communication between modem 244 and a RESPR DB system 40A, 40B, 40C, and an application user system 60.

The ROM 236 may store program instructions to be executed by the CPU 232, web-server 254, or application module 252. The RAM 234 may be used to store temporary program information, queues, databases, and overhead information. The storage device 238 may comprise any convenient form of data storage and may be used to store temporary program information, queues, databases, and overhead information.

Any of the components previously described can be implemented in a number of ways, including embodiments in software. Any of the components previously described can be implemented in a number of ways, including embodiments in software. Thus, the CPU 232, web-server 254, application module 252, modem/transceiver 244, antenna 246, storage 238, RAM 234, ROM 236, database 248, database 256, CPU 262, application module 292, transceiver ASIC 274, antenna 284, microphone 288, speaker 282, ROM 266, RAM 264, database 267, user input 272, display 268, RESPA system 50, RESPR DB system 40A, 40B, 40C, application user system 60, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A computer-implemented method of analyzing real property data, the real property data consisting of electronic data related to real property stored in a plurality of independent databases, comprising:

receiving one or more filters related to real property and real property sales transactions from a User via a user system;

collecting electronic real property data from plurality of independent databases based on the received one or more filters related to real property and real property sales transactions;

creating a plurality of subsets of real properties based on the collected electronic real property data based on one or more of the received one or more filters related to real property and real property sales transactions;

analyzing each of the plurality of subsets of real properties to determine a score,. wherein the determined score for each of the plurality of subsets of real properties is a weighted combination of at least three attributes, the attributes including three of the number of properties sold in a predetermined time interval divided by the total number of properties in one of plurality of subsets of real properties, the average property price of listed and sold in the one of plurality of subsets of real properties; the percentage of active properties represented by one of a single real estate agent, groups of real estate agents, a real estate brokerage, and groups of real estate brokerages in one of plurality of subsets of real properties, and the average number of days on market for active properties in one of plurality of subsets of real properties; and forwarding a user interface to a user system enabling a User to view the plurality of subsets of real properties and the determined score for each of the plurality of subsets of real properties.

2. The computer-implemented method of claim 1, further comprising providing a user interface to a user system enabling a User to select one or more filters related to real property and real property sales transactions.

3. The computer-implemented method of claim 1, forwarding data viewable on a user interface to a user system enabling a User to view the plurality of subsets of real properties and the determined score for each of the plurality of subsets of real properties.

4. The computer-implemented method of claim 1, wherein the user interface is a web browser.

5. The computer-implemented method of claim 1, wherein one or more filters related to real property and real property sales transactions includes one of real estate agent, groups of real estate agents, a real estate brokerage, and groups of real estate brokerages.

6. The computer-implemented method of claim 1, wherein one or more filters related to real property and real property sales transactions includes at least one property type.

7. The computer-implemented method of claim 1, wherein one or more filters related to real property and real property sales transactions includes the percentage of active properties represented by one of a single real estate agent, groups of real estate agents, a real estate brokerage, and groups of real estate brokerages.

8. The computer-implemented method of claim 1, wherein one or more filters related to real property and real property sales transactions includes the number of properties sold in a predetermined time interval divided by the total number of properties in each of the created plurality of subsets of real properties.

9. The computer-implemented method of claim 5, forwarding data viewable on a user interface to a user system enabling a user to view the plurality of subsets of real properties and the determined score for each of the plurality of subsets of real properties.

10. The computer-implemented method of claim 8, forwarding data viewable on a user interface to a user system enabling a User to view the plurality of subsets of real properties and the determined score for each of the plurality of subsets of real properties.

11. A computer-implemented method of analyzing real property data, the real property data consisting of electronic data related to real property stored in a plurality of independent databases, comprising:
  collecting electronic real property data from plurality of independent databases;
  receiving one or more filters related to real property and real property sales transactions from a User via a user system;
  extracting electronic real property data from the collected plurality of independent databases based on the received one or more filters related to electronic real property data real property and real property sales transactions;
  creating a plurality of subsets of real properties based on the extracted electronic real property data based on one or more of the received one or more filters related to real property and real property sales transactions;
  analyzing each of the plurality of subsets of real properties to determine a score, wherein the determined score for each of the plurality of subsets of real properties is a weighted combination of at least three attributes, the attributes including three of the number of properties sold in a predetermined time interval divided by the total number of properties in one of plurality of subsets of real properties, the average property price of listed and sold in the one of plurality of subsets of real properties; the percentage of active properties represented by one of a single real estate agent, groups of real estate agents, a real estate brokerage, and groups of real estate brokerages in one of plurality of subsets of real properties, and the average number of days on market for active properties in one of plurality of subsets of real properties; and
  forwarding a user interface to a user system enabling a User to view the plurality of subsets of real properties and the determined score for each of the plurality of subsets of real properties.

12. The computer-implemented method of claim 11, further comprising providing a user interface to a user system enabling a User to select one or more filters related to real property and real property sales transactions.

13. The computer-implemented method of claim 11, forwarding data viewable on a user interface to a user system enabling a User to view the plurality of subsets of real properties and the determined score for each of the plurality of subsets of real properties.

14. The computer-implemented method of claim 11, wherein the user interface is a web browser.

15. The computer-implemented method of claim 11, wherein one or more filters related to real property and real property sales transactions includes one of real estate agent, groups of real estate agents, a real estate brokerage, and groups of real estate brokerages.

16. The computer-implemented method of claim 11, wherein one or more filters related to real property and real property sales transactions includes at least one property type.

17. The computer-implemented method of claim 11, wherein one or more filters related to real property and real property sales transactions includes the percentage of active properties represented by one of a single real estate agent, groups of real estate agents, a real estate brokerage, and groups of real estate brokerages.

18. The computer-implemented method of claim 11, wherein one or more filters related to real property and real property sales transactions includes the number of properties sold in a predetermined time interval divided by the total number of properties in each of the created plurality of subsets of real properties.

19. The computer-implemented method of claim 15, forwarding data viewable on a user interface to a user system enabling a User to view the plurality of subsets of real properties and the determined score for each of the plurality of subsets of real properties.

20. The computer-implemented method of claim 18, forwarding data viewable on a user interface to a user system enabling a User to view the plurality of subsets of real properties and the determined score for each of the plurality of subsets of real properties.

* * * * *